United States Patent
Liu et al.

(10) Patent No.: US 11,386,633 B2
(45) Date of Patent: Jul. 12, 2022

(54) IMAGE AUGMENTATION FOR ANALYTICS

(71) Applicant: QUALCOMM Incorporated, San Diego, CA (US)

(72) Inventors: Peng Liu, San Diego, CA (US); Lei Wang, San Diego, CA (US); Zhen Wang, San Diego, CA (US); Ke-Li Cheng, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/109,045

(22) Filed: Dec. 1, 2020

(65) Prior Publication Data
US 2021/0390789 A1    Dec. 16, 2021

Related U.S. Application Data

(60) Provisional application No. 63/038,808, filed on Jun. 13, 2020.

(51) Int. Cl.
*G06T 19/20* (2011.01)
*G06T 7/50* (2017.01)
(Continued)

(52) U.S. Cl.
CPC ............ *G06T 19/20* (2013.01); *G06K 9/6256* (2013.01); *G06T 7/50* (2017.01); *G06T 7/70* (2017.01);
(Continued)

(58) Field of Classification Search
CPC . G06T 7/50; G06T 7/70; G06T 11/001; G06T 17/20; G06T 19/20;
(Continued)

(56) References Cited

U.S. PATENT DOCUMENTS

| 2020/0151940 A1* | 5/2020 | Yu .......................... G06T 15/04 |
| 2021/0286977 A1* | 9/2021 | Chen .................. G06K 9/00281 |
| 2021/0360199 A1* | 11/2021 | Oz .......................... H04N 7/144 |

FOREIGN PATENT DOCUMENTS

WO    2019237299 A1    12/2019

OTHER PUBLICATIONS

Richardson et al., "Learning detailed face reconstruction from a single image," in Proc. IEEE Conf. Comput. Vis. Pattern Recognit., 2017, pp. 5553-5562 (Year: 2017).*

(Continued)

*Primary Examiner* — Diane M Wills
(74) *Attorney, Agent, or Firm* — Polsinelli LLP

(57) ABSTRACT

Systems and techniques are provided for facial image augmentation. An example method can include obtaining a first image capturing a face. Using the first image, the method can determine, using a prediction model, a UV face position map including a two-dimensional (2D) representation of a three-dimensional (3D) structure of the face. The method can generate, based on the UV face position map, a 3D model of the face. The method can generate an extended 3D model of the face by extending the 3D model to include region(s) beyond a boundary of the 3D model. The region(s) can include a forehead region, a region surrounding at least a portion of the face, and/or other region. The method can generate, based on the extended 3D model, a second image depicting the face in a rotated position relative to a position of the face in the first image.

29 Claims, 12 Drawing Sheets

(51) Int. Cl.
*G06T 7/70* (2017.01)
*G06T 17/20* (2006.01)
*G06T 11/00* (2006.01)
*G06K 9/62* (2022.01)
*G06V 40/16* (2022.01)

(52) U.S. Cl.
CPC ............ *G06T 11/001* (2013.01); *G06T 17/20* (2013.01); *G06V 40/161* (2022.01); *G06T 2207/20084* (2013.01); *G06T 2207/20132* (2013.01); *G06T 2207/30201* (2013.01); *G06T 2219/2016* (2013.01)

(58) Field of Classification Search
CPC . G06T 2207/20084; G06T 2207/20132; G06T 2219/2016; G06T 2207/30201; G06K 9/00228
See application file for complete search history.

(56) References Cited

OTHER PUBLICATIONS

Zhu, Xiangyu, et al. "High-fidelity pose and expression normalization for face recognition in the wild." Proceedings of the IEEE conference on computer vision and pattern recognition. 2015. (Year: 2015).*

Egger B., et al., "3D Morphable Face Models—Past, Present and Future", arxiv.org, Cornell University Library, 201 Olin Library Cornell University Ithaca, NY 14853, Sep. 3, 2019 (Sep. 3, 2019), XP081644330, pp. 1-39, the Whole Document.

Feng Y., et al., "Joint 3D Face Reconstruction and Dense Alignment with Position Map Regression Network", arxiv.org, Cornell University Library, 201 Olin Library Cornell University Ithaca, NY14853, Mar. 21, 2018 (Mar. 21, 2018), XP080861522, 18 Pages, Cited in the application the whole document.

International Search Report and Written Opinion—PCT/US2021/032705—ISA/EPO—dated Aug. 25, 2021.

Ploumpis S., et al., "Towards a Complete 3D Morphable Model of the Human Head", arxiv.org, Cornell University Library, 201 Olin Library Cornell University Ithaca, NY 14853, Nov. 19, 2019 (Nov. 19, 2019), XP081535118, pp. 1-17, the Whole Document.

Savakar D.G., et al., "A Relative 3D Scan and Construction for Face Using Meshing Algorithm", Multimedia Tools and Applications, Kluwer Academic Publishers, Boston, US, vol. 77, No. 19, Mar. 3, 2018 (Mar. 3, 2018), pp. 25253-25273, XP036580502, ISSN: 1380-7501, DOI: 10.1007/S11042-018-5783-1 [retrieved on Mar. 3, 2018] the Whole Document.

Wang R., et al., "Digital Twin: Acquiring High-Fidelity 3D Avatar from a Single Image", arxiv.org, Cornell University Library, 201 Olin Library Cornell University Ithaca, NY 14853, Dec. 7, 2019 (Dec. 7, 2019), XP081547392, 20 Pages, the whole document.

* cited by examiner

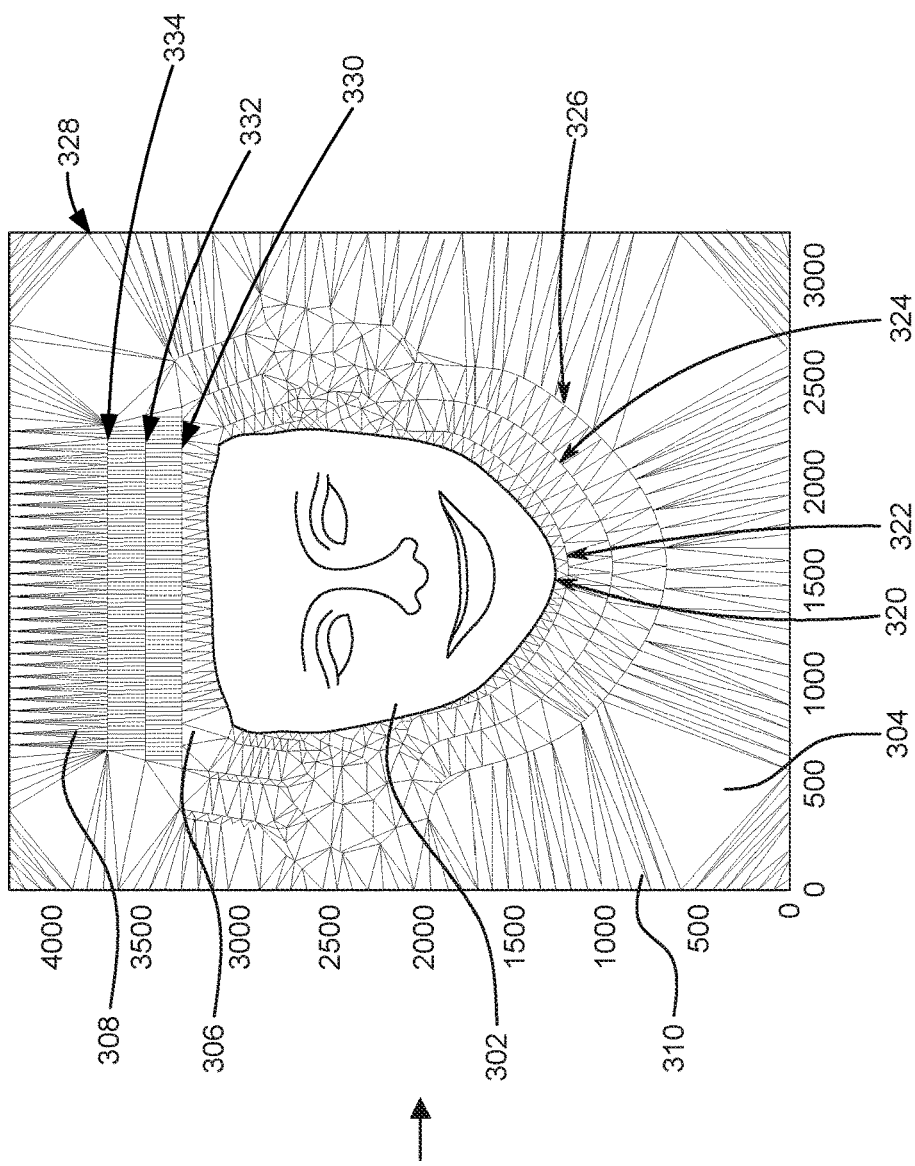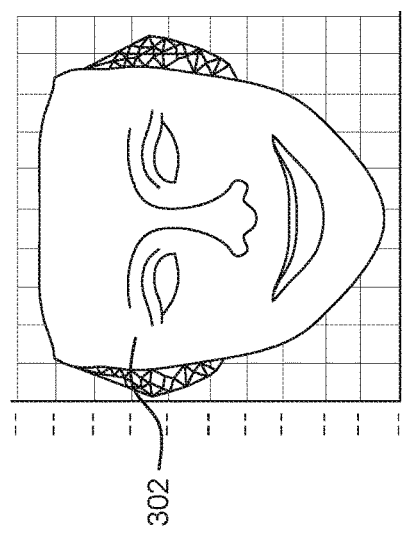
FIG. 3A

1000

```
Obtain a first image capturing a face of a user
1002
              ↓
Based on the first image, determine, using a prediction model, a UV face
position map including a two-dimensional (2D) representation of a three-
dimensional (3D) structure of the face
1004
              ↓
Generate, based on the UV face position map, a 3D model of the face
1006
              ↓
Generate an extended 3D model of the face
1008
              ↓
Generate, based on the extended 3D model of the face, a second image
depicting the face in a rotated position relative to a position of the face
in the first image
1010
```

FIG. 10

IMAGE AUGMENTATION FOR ANALYTICS

CROSS-REFERENCE TO RELATED APPLICATIONS

The present application claims the benefit of U.S. Provisional Application No. 63/038,808, filed Jun. 13, 2020, entitled "IMAGE AUGMENTATION FOR ANALYTICS", which is hereby incorporated by reference in its entirety and for all purposes.

TECHNICAL FIELD

The present disclosure generally relates to image processing, and more specifically to techniques and systems for image augmentation for analytics.

BACKGROUND

Many devices and systems are capable of generating images (or frames) and/or video data (including multiple frames) that capture scenes, objects, people, and/or other things. For example, a camera or a computing device including a camera (e.g., a mobile device such as a mobile telephone or smartphone including one or more cameras) can capture an image of a scene, a person, and/or an object. The image can be captured and processed by such devices and systems (e.g., mobile devices, IP cameras, etc.) and output for consumption (e.g., displayed on the device and/or other device). In some cases, the image can be captured and further processed for certain applications such as, for example, computer graphics, extended reality (e.g., augmented reality, virtual reality, and the like), image recognition (e.g., face recognition, object recognition, scene recognition, etc.), and feature estimation, among others. For example, an image can be processed to detect any objects or faces (e.g., using face or object recognition, etc.) that are present in the image, which can be useful for various applications.

BRIEF SUMMARY

In some examples, techniques and systems are described for performing image augmentation for analytics. According to at least one illustrative example, a method of face image augmentation is provided. In some examples, the method can include obtaining a first image capturing a face of a user; determining, based on the first image using a prediction model, a UV face position map including a two-dimensional (2D) representation of a three-dimensional (3D) structure of the face; generating, based on the UV face position map, a 3D model of the face; generating an extended 3D model of the face by extending the 3D model of the face to include one or more regions beyond a boundary of the 3D model of the face, the one or more regions including a forehead region and/or a region surrounding at least a portion of the face; and generating, based on the extended 3D model of the face, a second image depicting the face in a rotated position relative to a position of the face in the first image.

In another example, an apparatus is provided for face image augmentation is provided. In some aspects, the apparatus can include memory having stored thereon computer-readable instructions and one or more processors configured to obtain a first image capturing a face of a user; determine, based on the first image using a prediction model, a UV face position map including a two-dimensional (2D) representation of a three-dimensional (3D) structure of the face; generate, based on the UV face position map, a 3D model of the face; generate an extended 3D model of the face by extending the 3D model of the face to include one or more regions beyond a boundary of the 3D model of the face, the one or more regions including a forehead region and/or a region surrounding at least a portion of the face; and generate, based on the extended 3D model of the face, a second image depicting the face in a rotated position relative to a position of the face in the first image.

In another example, a non-transitory computer-readable medium is provided for face image augmentation is provided. In some aspects, the non-transitory computer-readable medium can include instructions that, when executed by one or more processors, cause the one or more processors to obtain a first image capturing a face of a user; determine, based on the first image using a prediction model, a UV face position map including a two-dimensional (2D) representation of a three-dimensional (3D) structure of the face; generate, based on the UV face position map, a 3D model of the face; generate an extended 3D model of the face by extending the 3D model of the face to include one or more regions beyond a boundary of the 3D model of the face, the one or more regions including a forehead region and/or a region surrounding at least a portion of the face; and generate, based on the extended 3D model of the face, a second image depicting the face in a rotated position relative to a position of the face in the first image.

In another example, an apparatus is provided for face image augmentation is provided. In some aspects, the apparatus can include means for obtaining a first image capturing a face of a user; determining, based on the first image using a prediction model, a UV face position map including a two-dimensional (2D) representation of a three-dimensional (3D) structure of the face; generating, based on the UV face position map, a 3D model of the face; generating an extended 3D model of the face by extending the 3D model of the face to include one or more regions beyond a boundary of the 3D model of the face, the one or more regions including a forehead region and/or a region surrounding at least a portion of the face; and generating, based on the extended 3D model of the face, a second image depicting the face in a rotated position relative to a position of the face in the first image.

In some aspects, the method, apparatuses, and computer-readable medium described above can include detecting a face region in the first image, the face region including the face of the user and cropping the first image to include the face region by removing one or more other portions of the first image other than the face region, wherein determining the UV face position map is based on the cropped first image.

In some examples, the prediction model can include a convolutional neural network (CNN), and the UV face position map can record the 3D structure of the face in UV space.

In some examples, the UV face position map is projected onto a color image space. In some cases, color channels in the UV face position map include 3D locations of points in the UV face position map, and the 3D locations include 3D coordinates in the 3D structure of the face.

In some cases, generating the 3D model of the face can include projecting the UV face position map to 3D space. In some examples, the 3D model can include a 3D face mesh including vertices connected by edges and faces, and the 3D face mesh is generated by assigning 3D coordinates to the vertices, the 3D coordinates corresponding to the 3D structure of the face and corresponding points in the UV face position map.

In some aspects, the method, apparatuses, and computer-readable medium described above can include determining depth information associated with the forehead region and/or the region surrounding at least a portion of the face, wherein the depth information includes a first depth of the forehead region and/or a second depth of the region surrounding at least a portion of the face, and the extended 3D model is generated based on the depth information.

In some examples, determining the depth information can include estimating depths of a first group of anchor points on a face region and at least one of a second group of anchor points on the forehead region and a third group of anchor points on the region surrounding at least a portion of the face. In some cases, a depth of an anchor point is estimated based on a first location of the anchor point within the 3D model and a distance of the anchor point to a second location on the face.

In some cases, the second group of anchor points and/or the third group of anchor points is estimated based on 3D coordinates of the first group of anchor points. In some cases, generating the extended 3D model can include triangulating the first group of anchor points and the second group of anchor points and/or the third group of anchor points.

In some aspects, the method, apparatuses, and computer-readable medium described above can include estimating the first depth of the forehead region by: estimating a forehead shape corresponding to the forehead region; determining a set of different circles within the forehead shape; and estimating the first depth of the forehead region based on a respective radius of each circle of the set of different circles.

In some aspects, the method, apparatuses, and computer-readable medium described above can include estimating the first depth of the forehead region based on the 3D model of the face and a 3D morphable head model describing a 3D shape of a head.

In some examples, the region surrounding at least a portion of the face can include a background region of the first image, a hair region, a neck region, and/or an ear region.

In some cases, generating the second image can include mapping the first image to the extended 3D model, and rotating the face in the mapping of the first image to the extended 3D model, the face being rotated in the rotated position.

In some aspects, the apparatus can be, or can be part of, a camera (e.g., an IP camera), a mobile device (e.g., a mobile telephone or so-called "smartphone," or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIGS. 3A and 3B are diagrams illustrating different views of an example extended three-dimensional (3D) face mesh generated based on an example 3D face mesh that is not extended, in accordance with some examples of the present disclosure;

FIG. 10 is a flowchart illustrating an example method for face image augmentation, in accordance with some examples of the present disclosure.

DETAILED DESCRIPTION

Figure 1:
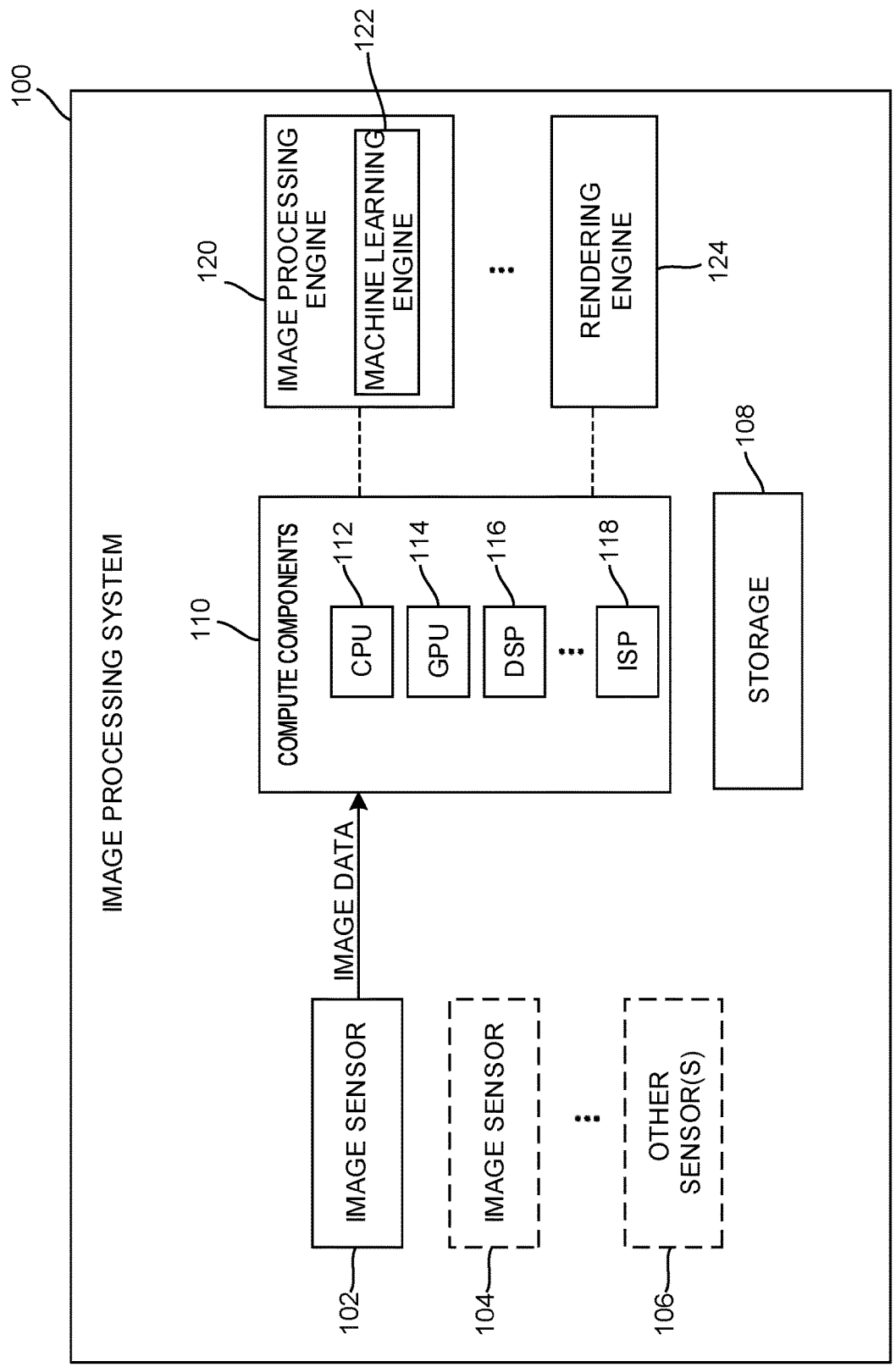
FIG. 1 is a simplified block diagram illustrating an example image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In image processing, face analytics can be used to detect, recognize, and/or classify faces, facial features, and/or other characteristics from faces in images and/or videos. Face analytics can be used in a wide array of applications such as, for example and without limitation, computer graphics, extended reality (XR) (e.g., including augmented reality (AR), virtual reality (VR), mixed reality (MR), etc.), facial recognition, emotion/expression detection, eye gaze estimation, age estimation, gender estimation, face rendering, face counting, among others. The face analytics performance can depend on, or can be impacted by, the quality and/or characteristics of the facial images used. For example, the performance of face analytics can be negatively or positively affected by the head poses and/or facial expressions in the facial images used. In many cases, the performance of face analytics can drop as a result of variations in the pose and/or expression of a user's face.

The performance of face analytics can also depend on the amount of face data available for training a machine learning system (e.g., one or more neural networks) and/or for analysis. For example, a larger amount of facial images with different head poses and/or facial expressions can help increase the face analytics performance. However, the face data (and/or face data from different head poses) available for face analytics is typically limited and can be insufficient for accurate and/or reliable face analytics. In many cases, multi-view facial images for face analytics may not otherwise be available and can be difficult and computationally costly to acquire. It is also difficult to perform face rotation (described below) from available face data. For example, it can be desired to perform face rotation in order to generate additional facial images with different head poses. The additional facial images can be used for face analytics.

In some cases, deep neural networks, such as deep convolutional neural networks (CNNs), can be used to perform face analytics. A CNN can implement numerous parameters (e.g., weights parameters, etc.), and can demand or require a significant amount of data for training the CNN. However, the data available for training is often limited. In some cases, obtaining sufficient amounts of such data can be difficult and costly. Data augmentation can be performed to generate additional face data from existing facial images. The additional face data can then be used to train neural networks such as CNNs. Face rotation techniques can be used to synthesize multi-view faces from one or more facial images (e.g., a single facial image) with one or more image viewpoints (e.g., an image from any angle with respect to the face). In some examples, three-dimensional (3D) models can be implemented to synthesize multi-view faces, given a single face image with any image viewpoint. One non-limiting example of performing single image 3D face rotation and/or reconstruction is based on a 3D morphable model (3DMM), such as the 3DMM described in Volker Blanz and Thomas Vetter, "A morphable model for the synthesis of 3D faces," International Conference On Computer Graphics and Interactive Techniques, 1999, which is hereby incorporated by reference in its entirety and for all purposes. 3DMM models have generative capabilities and can be used to capture variations of 3D faces. However, 3DMM models of faces only include a portion of the forehead region of the faces and do not include other regions such as the hair region. Moreover, augmented face data without (or with limited amounts of) forehead, hair, and/or background regions can appear unrealistic (e.g., fake).

In some aspects, systems, devices, processes (also referred to as methods), and computer-readable media (hereinafter referred to as "systems and techniques") are described herein that can provide an accurate and efficient face augmentation framework for face analytics. In some examples, the face augmentation framework can be used for face analytics using a facial image with a head pose and/or facial expression (e.g., a facial image having any head pose and/or facial expression). In some cases, the face augmentation framework can be used for face analytics without constraints on the specific head pose and/or facial expression of the facial image used. In some examples, a UV face position map (also referred to as a UV position map) can be generated for an input image that includes a face. The UV face position map can provide and/or represent a 2D map of the face in the input image. For instance, the UV face position map can be a 2D image that records and/or maps the 3D positions of points (e.g., pixels) in UV space (e.g., 2D texture coordinate system). The U in the UV space and the V in the UV space can denote the axes of the UV face position map (e.g., the axes of a 2D texture of the face). In one illustrative example, the U in the UV space can denote a first axis (e.g., a horizontal X-axis) of the UV face position map and the V in the UV space can denote a second axis (e.g., a vertical Y-axis) of the UV face position map. In some examples, the UV position map can record, model, identify, represent, and/or calculate a 3D shape, structure, contour, depth and/or other details of the face (and/or a face region of the face).

In some implementations, the UV face position map can be extended as further described herein to generate an extended UV face position map (also referred to as an extended UV position map). For instance, the UV position map can be extended to include other regions of the face that are not included in the UV position map. Examples of such other regions can include a forehead region and/or other regions in the input image that are outside of the face or face region, such as a hair region, a background region, and/or any other region in the input image (that are not included in the UV position map). In one example, the UV position map can be extended to include a background region (or a portion thereof), a hair region (or a portion thereof), a forehead region (or a portion thereof), and/or any other region(s) surrounding the face or otherwise outside of the face region.

The extended UV position map can be mapped to the input image. A face in the mapped input image and the extended UV position map can be rotated to generate a rotated face corresponding to the face in the original input image. In some examples, the rotated face can be used to provide additional and/or different face data (e.g., additional and/or different facial views, poses, etc.) for face analytics. For instance, the additional and/or different face data can be used to train face analytics models (e.g., CNNs, etc.) and/or various face analytics applications. The extended UV position map can allow areas of the face (and/or face region) and/or areas outside of (e.g., surrounding) the face or face region to be cropped, manipulated, mapped, and/or modified when performing face rotation. The face or face region can be rotated and/or cropped, manipulated, modified, etc., without compromising (e.g., losing or with a limited loss, distorting, and/or negatively impacting) one or more details of the face such as, for example, an identity, a facial expression, a facial-related attribute (e.g., an age attribute, a race attribute, a gender attribute, a geometry or shape attribute, a face configuration attribute, a texture, a face mark, a face symmetry attribute, a visual attribute of one or more areas of the face, etc.), and/or other information about the face.

As noted above, a UV face position map generated from an input image with a face can be used to generate augmented face data, including data about one or more regions of the face and/or one or more surrounding regions (e.g., a forehead region, a hair region, a background region, a neck region, etc.). In some examples, the UV position map can be used to generate augmented face data with estimated depth information for one or more regions of the face (or the entire face) and/or one or more surrounding regions (e.g., the forehead region, the hair region, the background region, etc.), as further described herein.

In some examples, the face augmentation framework can synthesize rotated faces using a single image. For instance, the face augmentation framework can achieve face rotation, such as arbitrary-angle face rotation and/or any other face rotation or face rotation angle. While the systems and techniques described herein can achieve face rotation using a single image, it should be noted that, in some cases, the face augmentation framework can also synthesize rotated faces using more than one image. Moreover, in some aspects, the visual features, data, and/or appearance surrounding the face region, which can contain discriminative information (e.g., identifying and/or distinguishing/distinctive information about a facial or surrounding region, detail, part, feature, etc.), can be used for and/or implemented as part of the systems and techniques described herein.

As noted above, the systems and techniques described herein can perform face rotation for face analytics, while preserving one or more aspects of the face (e.g., an identity, a facial feature, a facial expression feature, an attribute, etc.). The face rotation can be used to generate facial images with different face angles/poses. The generated facial images can be used for various face analytics tasks and/or can implemented for one or more use cases and/or applications. Examples of use cases and/or applications include, without limitation, computer graphics, XR, face recognition, facial expression recognition, eye gaze estimation, age estimation, gender estimation, race estimation, face rendering, animation, among others. In some examples, the face rotation can include and/or can be performed at least in part by meshing an image of a face into an extended UV face position map generated from the image of the face. In some cases, the systems and techniques can normalize the extended UV face position map with 3D transformations to generate a corresponding 3D mesh of the face. As described above, the extended UV face position map and 3D mesh of the face can enable face rotation while preserving details and/or information associated with the face, such as texture information, identity information, facial expression information, facial features and/or attributes, etc.

Examples of the systems and techniques described herein for face image augmentation and face analytics are illustrated in FIG. 1-FIG. 9 and are described below. FIG. 1 is a diagram illustrating an example image processing system 100. The image processing system 100 can perform face image augmentation and face analytics, as further described herein. Moreover, the image processing system 100 can perform various image processing tasks and/or generate various image processing effects such as, for example, generating chroma keying effects, performing feature extraction, performing various image recognition tasks (e.g., face recognition, expression recognition, gender recognition, eye gaze recognition, age estimation, race estimation, object recognition, etc.), performing face rendering, performing machine vision, performing face rotation, and/or performing any other image processing tasks.

In some illustrative examples, the image processing system 100 can perform face image augmentation. In some cases, the image processing system 100 can generate facial images with rotated faces from one or more image capturing devices (e.g., cameras, image sensors, etc.). For example, in some implementations, the image processing system 100 can perform face image augmentation and generate facial images with rotated faces from a single image captured by an image sensor device. In some implementations, the image processing system 100 can perform face image augmentation and generate facial images with rotated faces from multiple images captured by the image sensor device (and/or other image sensor devices).

In the example shown in FIG. 1, the image processing system 100 includes an image sensor 102, a storage 108, compute components 110, an image processing engine 120, a machine learning engine 122, and a rendering engine 124. The image processing system 100 can also optionally include one or more additional image sensors 104 and one or more other sensors 106, such as a radar sensor, a light detection and ranging (LIDAR) sensor, an infrared (IR) sensor, etc. For example, in dual camera or image sensor applications, the image processing system 100 can include front and rear image sensors (e.g., 102, 104).

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a drone, a computer in a car, an Internet-of-Things (IoT) device, or any other suitable electronic device(s).

In some implementations, the image sensor 102, the image sensor(s) 104, the other sensor(s) 106, the storage 108, the compute components 110, the image processing engine 120, the machine learning engine 122, and the rendering engine 124 can be part of the same computing device. For example, in some cases, the image sensor 102, the image sensor(s) 104, the other sensor(s) 106, the storage 108, the compute components 110, the image processing engine 120, the machine learning engine 122, and the rendering engine 124 can be integrated into a smartphone, laptop, tablet computer, smart wearable device, gaming system, and/or any other computing device. However, in some implementations, the image sensor 102, the image sensor(s) 104, the other sensor(s) 106, the storage 108, the compute components 110, the image processing engine 120, the machine learning engine 122, and/or the rendering engine 124 can be part of two or more separate computing devices.

The image sensors 102 and 104 can be any type of image sensor (or image capture devices) and/or video sensor (or video capture devices). For instance, the image sensors 102 and/or 104 can be a digital camera sensor, a video camera sensor, a smartphone camera sensor, an image/video capture device included as part of an electronic apparatus (e.g., a television, a computer, a camera, etc.). In some cases, the image sensors 102 and 104 can be part of a camera or computing device, such as a digital camera, a video camera, an IP camera, a smartphone, a smart television, a game system, or other computing device. In some examples, the image sensor 102 can be a rear image capturing device (e.g., a camera, video, and/or image sensor on a back or rear of a device) and the image sensor 104 can be a front image capturing device (e.g., a camera, image, and/or video sensor on a front of a device). In some examples, the image sensors 102 and 104 can be part of a dual-camera assembly. The image sensors 102 and 104 can capture the image and/or video content (e.g., raw image and/or video data). The image and/or video content can be processed by the compute components 110, the image processing engine 120, the machine learning engine 122, and/or the rendering engine 124 as described herein.

The other sensor(s) 106 can be any sensor for detecting and measuring information such as distance, motion, position, depth, speed, etc. Non-limiting examples of other sensors 106 include LIDARs, gyroscopes, accelerometers, magnetometers, IR sensors, inertial measurement units (IMUs), radar sensors, machine vision sensors, etc. In some cases, the image processing system 100 can include other sensors, such as a smart scene sensor, a speech recognition sensor, an impact sensor, a position sensor, a tilt sensor, a light sensor, etc.

The storage 108 can be any storage device(s) for storing data, such as image or video data for example. Moreover, the storage 108 can store data from any of the components of the image processing system 100. For example, the storage 108 can store data or measurements from any of the sensors 102, 104, 106, data from the compute components 110 (e.g., processing parameters, outputs, generated images, calculation results, etc.), and/or data from any of the image processing engine 120, the machine learning engine 122, and/or the rendering engine 124 (e.g., output images, processing results, etc.). In some examples, the storage 108 can include a buffer for storing data (e.g., image data) for processing by the compute components 110.

In some implementations, the compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, object or image segmentation, computer vision, graphics rendering, augmented reality, image/video processing, sensor processing, recognition (e.g., text recognition, object recognition, feature recognition, face recognition, facial expression recognition, eye gaze recognition, age recognition, gender recognition, race recognition, tracking or pattern recognition, scene change recognition, etc.), disparity detection, machine learning, filtering, face augmentation, face analytics, facial rendering, and any of the various operations described herein. In some examples, the compute components 110 can implement the image processing engine 120, the machine learning engine 122, and the rendering engine 124. In other examples, the compute components 110 can also implement one or more other processing engines.

Moreover, the operations for the image processing engine 120, the machine learning engine 122, and the rendering engine 124 can be implemented by one or more of the compute components 110. In one illustrative example, the image processing engine 120 and the machine learning engine 122 (and associated operations) can be implemented by the CPU 112, the DSP 116, and/or the ISP 118, and the rendering engine 124 (and associated operations) can be implemented by the GPU 114. In some cases, the compute components 110 can include other electronic circuits or hardware, computer software, firmware, or any combination thereof, to perform any of the various operations described herein.

In some cases, the compute components 110 can receive data (e.g., image data, video data, etc.) captured by the image sensor 102 and/or the image sensor 104, and process the data to generate UV position maps, 3D face meshes, output images (or frames) such as facial images with rotated faces, etc. For example, the compute components 110 can receive image data (e.g., one or more images, etc.) captured by the image sensor 102, detect a face in the image data, generate a UV position map based on the image data, generate a 3D face mesh based on the UV position map, estimate depth information (e.g., background depth information, forehead depth information, hair depth information, etc.), generate an extended UV position map, generate a facial image with the face rotated, extract features and information (e.g., color information, texture information, semantic information, etc.) from the image data, etc. An image (or frame) can be a red-green-blue (RGB) image or frame having red, green, and blue color components per pixel; a luma, chroma-red, chroma-blue (YCbCr) image or frame having a luma component and two chroma (color) components (chroma-red and chroma-blue) per pixel; or any other suitable type of color or monochrome picture.

The compute components 110 can implement the image processing engine 120 and the machine learning engine 122 to perform various image processing operations, such as face detection, face image augmentation, face rotation, face rendering, facial image generation, face analytics, 2D and/or 3D modeling, etc. For example, the compute components 110 can implement the image processing engine 120 and the machine learning engine 122 to perform face detection, face image augmentation, face rotation, modeling, and face analytics, as further described herein. The compute components 110 can process image data captured by the image sensors 102 and/or 104, image data stored in the storage 108, image data received from a remote source (e.g., a remote camera, a server, a content provider, any combination thereof, and/or other remote source), image data obtained from a combination of sources, any combination thereof, and/or other image data.

In some examples, the compute components 110 can detect (e.g., via the image processing engine 120 and/or the machine learning engine 122) a face in a facial image. The compute components 110 can estimate a UV face position map from the facial image. The compute components 110 can estimate a depth of one or more regions (e.g., a forehead region, a region surrounding the face, a background region, etc.), and can extend the UV position map (or a 3D mesh model generated based on the UV position map) based on the estimated depth. The compute components 110 can map the input facial image to the extended UV position map (or an extended 3D mesh model). In some cases, the compute components 110 can rotate the face in an output image corresponding to the mapping of the facial image and the extended UV position map. The face can be rotated so that the face has a different pose (e.g., a different direction/angle) than the face in the input facial image. In some examples, the output image with the rotated face can be used to perform face analytics, train the machine learning engine 122 for face analytics tasks, any combination thereof, and/or perform other applications and/or tasks.

In some examples, the machine learning engine 122 can include (e.g., can implement, can contain, etc.) one or more neural networks. For example, in some cases, the machine learning engine 122 can include one or more deep convolution neural networks (CNNs) that can be used for face augmentation and/or face analytics, as further described herein. In some cases, a neural network implemented by the machine learning engine 122 can include an encoder-decoder structure, as described herein. In other examples, the machine learning engine 122 can implement any other models and/or any other neural network types and/or architectures.

In some examples, the rendering engine 124 can receive output images from the compute components 110 and render the output images for presentation on a display device such as, for example, a screen/display, a television, a projector, etc. In some examples, the rendering engine 124 can receive generated images from the image processing engine 120 and/or the machine learning engine 122 and render the images. In some cases, the rendering engine 124 can perform facial rendering based on image data generated by the image processing engine 120 and/or the machine learning engine 122.

In one illustrative example, the image processing system 100 can perform (e.g., via image processing engine 120 and/or machine learning engine 122) a process for face rotation as described below. In some examples, the image processing system 100 can perform face detection to detect a face (and/or a region of a face) in an input image. The image processing system 100 can perform face detection using one or more face detection and/or recognition techniques. Examples of face detection and/or recognition techniques include, without limitation, image segmentation, feature detection and/or extraction, deep neural network-based image processing, classification, feature-based techniques, appearance-based techniques, knowledge-based techniques, template matching, any combination thereof, and/or any other facial detection and/or recognition techniques.

As noted above, the image processing system 100 (e.g., using compute components 110) can estimate the UV face position map from the face detected in the input image. In some examples, the image processing system 100 can crop the input image to remove one or more portions of the input image outside of the detected face. The image processing system 100 can use the cropped image to generate the UV face position map. For example, the image processing system 100 can identify a bounding box around the detected face, a hair region, and optionally a portion of the background region of the input image. The image processing system 100 can crop the input image to exclude one or more portions outside of the bounding box. The image processing system 100 can then use the cropped image to estimate the UV face position map.

In some examples, the UV face position map can provide a 2D representation of a 3D facial structure of the face. In some cases, the UV face position map can represent and/or describe the face and/or a region of the face (e.g., a face region). In other cases, the UV face position map can include other regions of the input image such as, for example, one or more regions of a user, scene, and/or background captured by the input image. In some examples, the UV face position map can be a 2D image that records and/or maps the 3D positions of points (e.g., pixels) in UV space (e.g., 2D texture coordinate system). For example, the UV face position map can include a 2D texture map that maps points (e.g., pixels) in the 2D texture map to vertices and/or coordinates of a 3D representation (e.g., a 3D mesh, model, surface, geometry, etc.) of the face. As another example, the UV face position map can include a 2D texture map that maps texture coordinates in the 2D texture map to position coordinates in 3D space.

In some cases, the UV face position map can include, represent, and/or describe a 2D texture of the face in UV space. The U in the UV space and the V in the UV space can denote the axes of the UV face position map (e.g., the axes of a 2D texture of the face). For example, the U in UV space can correspond to a horizontal X-axis in a texture coordinate system and the V in UV space can correspond to a vertical Y-axis in the texture coordinate system. In some cases, the UV space can include UVW axes and/or coordinates. For example, the UV space can include U coordinates corresponding to X coordinates in a 3D horizontal X-axis, V coordinates corresponding to Y coordinates in a 3D vertical Y-axis, and W coordinates corresponding to depth coordinates in a Z-axis in 3D space.

The UV face position map can preserve one or more aspects of the face in the input image, such as identity information, facial expression information, facial attributes, etc. In some cases, the image processing system 100 can project the UV face position map onto a color image space (e.g., R, G, B). In some examples, color channels (e.g., R, G, B) of the UV face position map projected onto the color image space can identify, include and/or store the X, Y, Z locations (e.g., XYZ coordinates in 3D space) of the points (e.g., pixels) of the UV face position map (e.g., of the points in the face's 2D texture map in UV space).

The image processing system 100 can generate a 3D face mesh (for modeling the face) based on the UV face position map. For example, the image processing system 100 can project and/or map the UV face position map to a 3D model of the face (e.g., to a surface of the 3D model of the face). In some cases, the 3D face mesh can be a 3D UV face position map generated based on the UV face position map. In some cases, the 3D face mesh can be a polygon mesh representing the structure of the face and/or the UV face position map. In some examples, the 3D face mesh can include a collection of vertices, edges, and faces that define a shape of the face in 3D space (as described below with respect to FIG. 7).

In some cases, the image processing system 100 can assign spatial coordinates (e.g., X, Y, Z coordinates) for each of the vertices of the 3D face mesh. In some cases, the image processing system 100 can fill in edges connecting specific and/or corresponding pairs of vertices and faces (e.g., across corresponding tuples of vertices or points). Using such a technique, in some examples, the image processing system 100 can regress the 3D geometry of the face and a dense correspondence (e.g., pixel level correspondence or alignment) between the 3D geometry of the face and a 2D image of the face (e.g., the input image and/or the UV face position map) from the 2D image of the face.

In some examples, the image processing system 100 can extend the 3D face mesh based on estimated depth information. For instance, the image processing system 100 can estimate a depth of a forehead region of the face, one or more regions surrounding the face such as a hair region, and/or one or more background regions in the image. Using the estimated depth, the image processing system 100 can extend the 3D face mesh to include additional regions, such as a forehead region (or additional regions of a forehead), a background region (or a portion of a background region), a hair region, and/or any other region surrounding the face and/or outside of the face. In some cases, as described in more detail below, the 3D face mesh can be extended onto a region outside of the face (e.g., a forehead region, a hair region, and/or a background region) by marking anchors beyond the face region and estimating their depth according to 3D head information. In some cases, extending the 3D face mesh can preserve information about the face (e.g., identity information/details, expression information/details, facial attributes, etc.) and information associated with the one or more regions surrounding and/or external to the face and/or face region.

The image processing system 100 can map the input image to the extended 3D face mesh (or vice versa). The image processing system 100 can rotate a face in the mapping of the input image and the extended 3D face mesh. The face can be rotated in any particular direction/angle. In some examples, a generated facial image with the rotated face can be used for face analytics and/or to train face analytics models, such as one or more neural networks (e.g., a convolutional neural network (CNN) or other neural network). In some cases, the image processing system 100 can generate and/or provide numerous face image samples (and/or face rotation image samples) for training one or more neural networks. In some examples, the image processing system 100 can use the generated images as augmented data for one or more applications such as, for example, facial recognition, facial expression classification, head pose estimation, facial attribute analysis (e.g., age, gender, race classification), computer graphics, animation, XR, among other scenarios and applications.

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 11.

Figure 2:
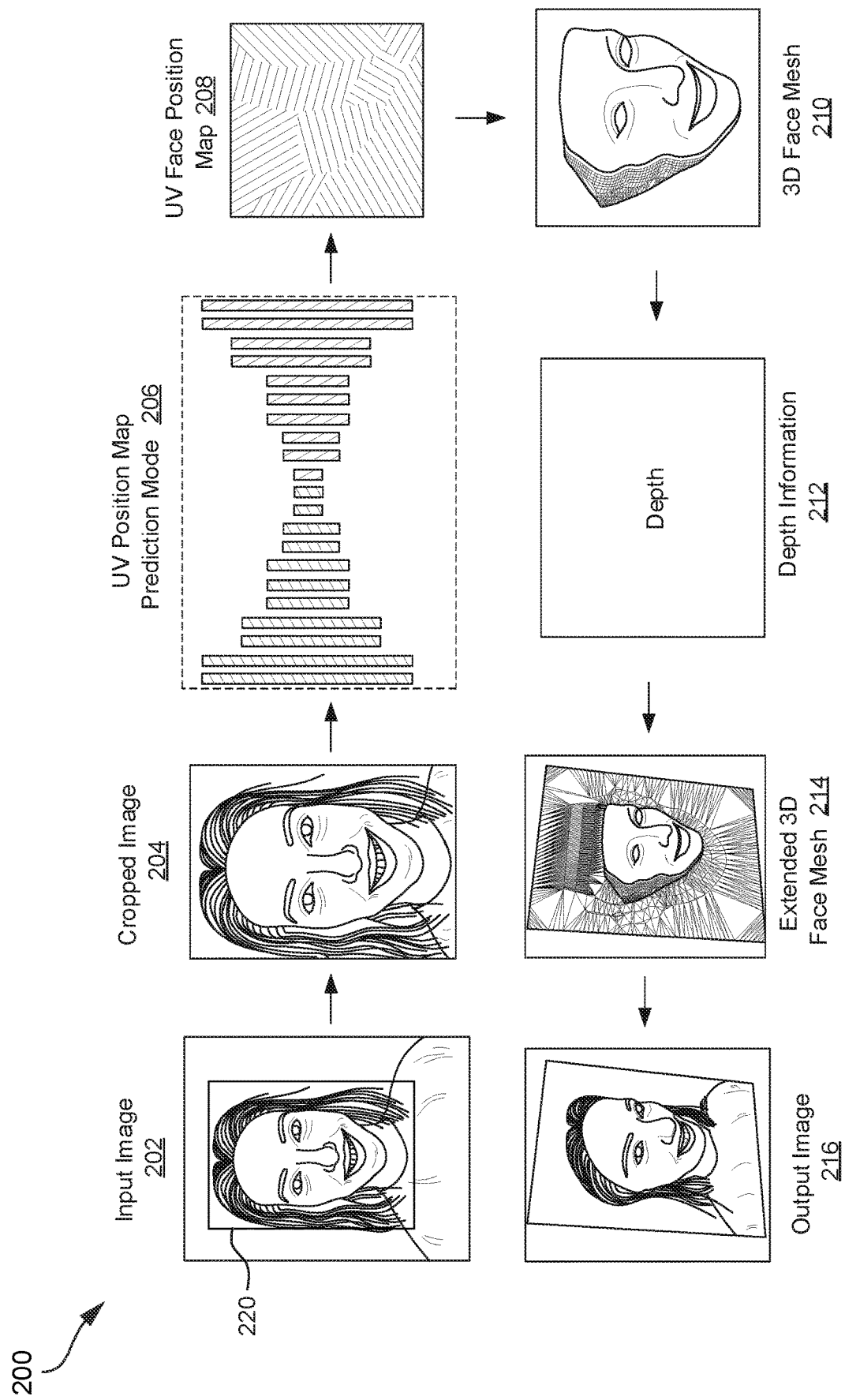
FIG. 2 is a diagram illustrating an example system flow for generating facial images with rotated faces, in accordance with some examples of the present disclosure.

FIG. 2 is a diagram illustrating an example system flow 200 for generating facial images with rotated faces. In the example shown in FIG. 2, the image processing system 100 can receive an input image 202 including a face, and can perform face detection to detect the face in the input image 202 (and/or a face region in the input image 202 including the face or a portion of the face). In some examples, the image processing system 100 can generate a bounding box 220 around the detected face and/or a region around the detected face. For example, the region around the detected face can be a region including the detected face and one or more regions surrounding the detected face (e.g., a forehead region, a hair region, a background region or portion thereof, etc.).

The image processing system 100 can then generate a cropped image 204 containing or including image data and/or contents within the bounding box 220. For example, the image processing system 100 can crop the input image 202 to exclude or remove any portion of the input image 202 outside of the bounding box 220. By excluding or removing image data outside of the bounding box 220, the cropped image 204 can include the detected face and any other image data from the input image 202 included within the bounding box 220.

The image processing system 100 can use the cropped image 204 as input to a UV position map prediction model 206. The map prediction model 206 is configured to estimate a UV face position map 208 based on the cropped image 204. In some cases, the UV position map prediction model 206 can include a machine learning system (e.g., a CNN) and can be implemented by the machine learning engine 122. In some examples, the UV position map prediction model 206 can include an encoder-decoder structure (e.g., including one or more convolutional layers and deconvolutional layers) trained to learn a transfer function. For instance, once trained, the machine learning system of the UV position map prediction model 206 can correlate a relationship between the input of the UV position map prediction model 206 (e.g., the cropped image 204) and an output of the UV position map prediction model 206 (e.g., the UV face position map 208). The correlation can be based on weights, biases, and/or other parameters of the encoder-decoder structure that are tuned during training. Using the correlation, the machine learning system can generate a UV face position map from the cropped image 204.

As noted above, the UV position map prediction model 206 can generate the UV face position map 208 using the cropped image 204 as input. The UV face position map 208 can provide a 2D representation of a 3D facial structure of the face in the cropped image 204. In some cases, the UV face position map 208 can represent and/or describe the face and/or a region of the face (e.g., a face region). In other cases, the UV face position map 208 can include other regions of the cropped image 204 such as, for example, one or more regions of the user and/or background in the cropped image 204. In some cases, the UV face position map 208 can preserve one or more aspects of the face in the cropped image 204, such as identity information, facial expression information, facial attributes, etc.

In some examples, the UV face position map 208 can be a 2D image that records and/or maps the 3D positions of points (e.g., pixels) in UV space (e.g., a 2D texture coordinate system). In some examples, the UV face position map 208 can include, represent, and/or describe a 2D texture of the face in UV space. In some cases, the UV face position map 208 can represent a structure of the face and can record 3D positions of points (e.g., pixels) in UV space. In one example, the UV face position map 208 can include a 2D texture map that maps points (e.g., pixels) in the 2D texture map to points (e.g., vertices and/or coordinates) on a 3D representation (e.g., a 3D geometry) of the face. As another example, the UV face position map 208 can include a 2D texture map that maps texture coordinates in the 2D texture map to position coordinates in 3D space. As described above, the U in UV space can correspond to a horizontal X-axis in a texture coordinate system and the V in UV space can correspond to a vertical Y-axis in the texture coordinate system. In some cases, the UV space can include UVW axes and/or coordinates. For example, the UV space can include U coordinates corresponding to X coordinates in a 3D horizontal X-axis, V coordinates corresponding to Y coordinates in a 3D vertical Y-axis, and W coordinates corresponding to depth coordinates in a Z-axis in 3D space.

In some cases, the UV face position map 208 can include a UV face position map projected onto a color image space or scope. In some examples, color channels (e.g., R, G, B) of the UV face position map 208 projected onto the color image space can identify, include, and/or store the X, Y, Z locations (e.g., XYZ coordinates in 3D space) of the points (e.g., pixels) of the UV face position map 208 (e.g., of the points in the face's 2D texture map in UV space).

As illustrated in FIG. 2, the image processing system 100 can generate a 3D face mesh 210 based on the UV face position map 208. For example, the image processing system 100 can project and/or map the UV face position map 208 to a 3D model of the face and/or a surface of a 3D model of the face. In some cases, the 3D face mesh 210 can be a 3D UV face position map generated based on the UV face position map 208. In some cases, the 3D face mesh 210 can be a polygon mesh representing the structure of the face and/or representing the UV face position map 208. In some examples, the 3D face mesh 210 can include a collection of vertices connected by edges and faces, and can define a shape of the face in 3D space.

In some examples, the 3D face mesh 210 can represent a 3D structure of the face and can include 3D positions of the points (e.g., pixels) from the UV face position map 208. For example, the 3D face mesh 210 can include or record a dense set of points of a 3D structure of the face and in some cases the semantic meaning of the points (e.g., what parts, structures, and/or categories or classes of parts of the face are defined and/or represented by the various points). In some cases, to generate the 3D face mesh 210, the image processing system 100 can obtain 3D coordinates corresponding to points (e.g., pixels) in the UV face position map 208. The image processing system 100 can then generate the 3D face mesh 210 based on a point cloud corresponding to the obtained 3D coordinates. For example, the image processing system 100 can triangulate points in the point cloud to generate the 3D face mesh 210. The image processing system 100 can implement a triangulation algorithm such as, for example, a Delaunay triangulation algorithm, to triangulate the points.

In some examples, when generating the 3D face mesh 210, the image processing system 100 can obtain a 3D structure of the face and a dense alignment (e.g., a pixel alignment/correspondence) between the 3D structure of the face and the face in the UV face position map 208 and/or the cropped image 204. The image processing system 100 can use a machine learning system (e.g., the UV position map prediction model 206) to regress the 3D face mesh 210 from the UV face position map 208 and/or the cropped image 204. The 3D face mesh 210 can include 3D information associated with the 3D structure of the face and the dense alignment between the 3D structure of the face and the face in the UV face position map 208 and/or the cropped image 204. One illustrative example way to determine the 3D structure of the face and perform dense alignment can be based on a position map regression network, described in Feng, Yao, et al, "Joint 3d face reconstruction and dense alignment with position map regression network," Proceedings of the European Conference on Computer Vision (ECCV), 2018, which is hereby incorporated by reference in its entirety and for all purposes.

In some examples, the image processing system 100 can generate the 3D face mesh 210 by assigning spatial coordinates (e.g., an X-coordinate, a Y-coordinate, and a Z-coordinate) for vertices of the 3D model of the face. The image processing system 100 can fill in edges connecting specific and/or corresponding pairs of vertices and faces (e.g., across corresponding tuples of vertices or points of the 3D model). Using such a technique, the image processing system 100 can use a 2D representation of the face (e.g., the cropped image 204 and/or the UV face position map 208) to determine or regress the 3D geometry of the face along with a dense correspondence (e.g., a pixel level correspondence/alignment) between the 3D geometry of the face and the 2D representation of the face, resulting in the 3D face mesh 210.

The image processing system 100 can then estimate depth information 212 associated with one or more regions of the face in the input image 202 and/or one or more regions surrounding the face. For example, in some cases, the image processing system 100 can estimate a depth of a forehead region of the face, a background region (or a portion thereof) of the cropped image 204, a hair region, a neck region, an ear region, etc. The depth information 212 can include the depth of the regions (e.g., the forehead region, the background region, the hair region, the neck region, the ear region, etc.). The depth information 212 can enable a smooth transition from the face region to other regions (e.g., the forehead region, the background region, the hair region, etc.) when extending the 3D face mesh 210 as further described herein.

The image processing system 100 can use the depth information 212 to generate an extended 3D face mesh 214. The extended 3D face mesh 214 can augment face data in the 3D face mesh 210 to include data (e.g., depth information, texture information, shape/geometry information, etc.) associated with other regions of and/or around the face such as, for example, a forehead region, a hair region, a background region, etc. In some examples, the extended 3D face mesh 214 can include the 3D face mesh 210 with additional regions (e.g., extended to include additional regions) associated with the depth information 212. For example, the extended 3D face mesh 214 can include the 3D face mesh 210 augmented (e.g., extended) to also include a forehead region, a hair region, and a background region. Using such a technique, the extended 3D face mesh 214 can be a mesh of a face, forehead, hair, and background region associated with a subject as well as a portion of the background (e.g., behind the subject) in the input image 202. In some cases, the extended 3D face mesh 214 can include other regions such as, for example, a neck region, an ear region, etc.

The image processing system 100 can then generate an output image 216 based on the extended 3D face mesh 214 and the input image 202. In some examples, to generate the output image 216, the image processing system 100 can map the input image 202 onto the extended 3D face mesh 214. In some cases, the image processing system 100 can rotate a face in the input image 202 (e.g., the face modeled in the extended 3D face mesh 214) based on the mapping. For instance, the output image 216 can include a person from the input image 202 with a different (e.g., rotated) head pose. In one example, the output image 216 can depict the person in the input image 202 with the person's face rotated a certain amount, direction, angle, etc. In some cases, the image processing system 100 can rotate a face in the input image 202 in response to receiving input from a user instructing the system 100 to rotate the face. The person's face can be rotated in any particular direction, angle, etc., as desired, regardless of the pose and/or angle of the person's face in the input image 202. In some examples, in addition to or as an alternative to including the rotated face, the output image 216 can include other rotated regions such as, for example, the forehead, hair, and background regions. For example, the output image 216 can depict the person in the input image 202 with the person's face, hair, and forehead regions rotated.

In some examples, the output image 216 with the rotated face (and any other rotated regions) can be used for face analytics and/or to train face analytics models, such as one or more neural networks (e.g., one or more CNNs). In some cases, the image processing system 100 can generate additional face image samples (with rotated faces) for use as training images for training the face analytics models. In some examples, the output image 216 (and any other output images generated as described herein) can be used as augmented face data for one or more applications (e.g., facial recognition, facial expression classification, head pose estimation, computer graphics, animation, XR, facial attribute analysis such as age, gender, and/or race classification, among other scenarios and applications).

In some cases, the depth information 212 and the extended 3D face mesh 214 described above can allow the output image 216 to appear more realistic (e.g., more natural, less fake/synthetic). In some cases, the depth information 212 and the extended 3D face mesh 214 can allow certain information (e.g., information identifying the face, a facial expression, one or more facial attributes, etc.) to be preserved in the output image 216. For example, the depth information 212 and the extended 3D face mesh 214 can preserve face information, details, and/or attributes when the extended 3D face mesh 214 is mapped to the input image 202 and the face (and any other regions) is rotated as described herein.

In some examples, to determine the depth information 212 and generate the extended 3D face mesh 214, the image processing system 100 can create n number of groups of anchors (e.g., nodes, points, etc.) around the face region in the 3D face mesh 210. The image processing system 100 can estimate the depth of the groups of anchors based on their locations and their relative distance to a center of the face. In some examples, the image processing system 100 can create five groups of anchors, and each group of anchors can have 160 anchor points. In other examples, the image processing system 100 can create more or less than five groups of anchors. In some examples, each group of anchors can have more or less than 160 anchor points. Example details regarding the use of the anchors are described below with respect to FIG. 3A and FIG. 3B.

While FIG. 2 is described with respect to facial images and face rotation, other examples can involve rotation of an object or animal (or a portion thereof) based on images of the object or animal and according to system flow 200. For example, in some cases, the input image (e.g., input image 202) can include an image of an object (e.g., a device, a vehicle, a structure, a building, an item, a piece of equipment, etc.) or animal, and the image of the object or animal can be used to derive a UV position map, a 3D mesh model, and an extended 3D mesh model for the object or animal, which can then be used to generate an output image (e.g., output image 216) of the object or animal (or a portion thereof) rotated. It should be understood that facial images and face rotation is provided herein as an illustrative example for explanation purposes.

Figure 3B:
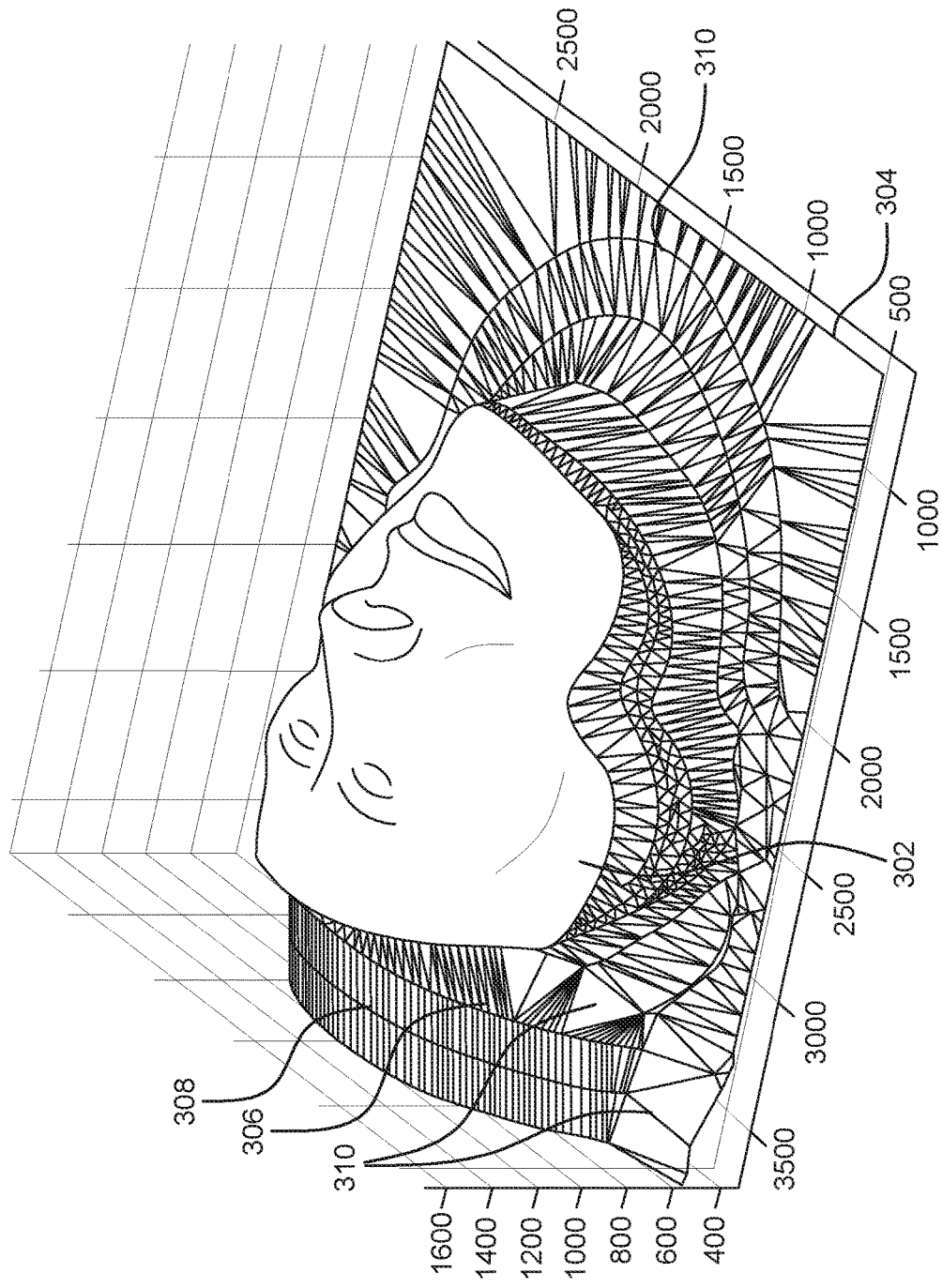

FIGS. 3A and 3B are diagrams illustrating different views of an example extended 3D face mesh 214 generated based on an example 3D face mesh 210. FIG. 3A illustrates a front view of the extended 3D face mesh 214 generated based on the 3D face mesh 210, and FIG. 3B illustrates a side view of the example extended 3D face mesh 214.

In some examples, the extended 3D face mesh 214 can be generated using anchor points in a face region 302 (e.g., a face) of the 3D face mesh 210 to estimate anchor points in a background region 304, a forehead region 306 and a hair region 308 (and/or head region), and performing Delaunay triangulation to triangulate the anchor points in the face region 302, the background region 304, the forehead region 306 and the hair region 308. In the illustrative examples in FIGS. 3A and 3B, the extended 3D face mesh 214 includes Delaunay triangles 310 in the face region 302, the background region 304, the forehead region 306 and the hair region 308. The Delaunay triangles 310 can be used to extend the background region 304, the forehead region 306 and the hair region 308, and generate the extended 3D face mesh 214. The extended 3D face mesh 214 can include the face region 302 and the background region 304, forehead region 306 and hair region 308 modeled using the Delaunay triangles 310.

In some examples, a first group of anchors 320 (e.g., a group of anchor points) can be located on a boundary of the face region 302. In some examples, other groups of anchors can also include groups of surrounding anchors covering forehead (e.g., forehead region 306), ear, neck, background (e.g., background region 304) and/or hair (and/or head) regions (e.g., hair region 308). For example, a second group of anchors 322, a third group of anchors 324, a fourth group of anchors 326, and a fifth group of anchors 328 can include surrounding anchors covering the background region 304, the forehead region 306, and the hair region 308 (and/or head region).

In some cases, the second group of anchors 322 can include anchor points surrounding the boundary of the face region 302 and located within one or more distances of one or more points on the face region 302, such as one or more points on a center of the face region 302. In some examples, the second group of anchors 322 can include a first forehead group of anchors 330 located within one or more distances of one or more points on the face region 302, a second forehead group of anchors 332 located within one or more larger distances of one or more points on the face region 302, and a third forehead group of anchors 334 located within one or more even larger distances of one or more points on the face region 302.

In some cases, the third group of anchors 324 can include anchor points surrounding the boundary of the face region 302 and located within one or more distances of the one or more points on the face region 302 (e.g., one or more points on a center of the face region 302). The third group of anchors 324 can be located farther from the one or more points on the face region 302 than the second group of anchors 322.

In some cases, the fourth group of anchors 326 can include anchor points surrounding the boundary of the face region 302 and located within one or more distances of the one or more points on the face region 302 (e.g., one or more points on a center of the face region 302). The fourth group of anchors 326 can be located farther from the one or more points on the face region 302 than the second group of anchors 322 and the third group of anchors 324.

In some cases, the fifth group of anchors 328 can include anchor points surrounding the boundary of the face region 302 and located within one or more distances of the one or more points on the face region 302 (e.g., one or more points on a center of the face region 302). The fifth group of anchors 328 can be located farther from the one or more points on the face region 302 than the second group of anchors 322, the third group of anchors 324, and the fourth group of anchors 326.

The image processing system 100 can obtain the first group of anchors 320 on a boundary of the face region 302, and select a number of anchors on the boundary of the face region 302. In some cases, the image processing system 100 can select a number of anchors on each side (e.g., top, bottom, left, and right) of the boundary of the face region. In some examples, the image processing system 100 can select a number of anchors uniformly on the boundary of the face region 302. For example, in some cases, the image processing system 100 can select n number of anchor points from each side (e.g., top, bottom, left, right) of the face region 302.

Since the anchor points from the first group of anchors 320 are on the face (e.g., the face region 302), the image processing system 100 can determine their corresponding 3D position from the 3D face mesh 210. In some cases, the image processing system 100 can use the first group of anchors 320 to estimate the other groups of anchors (e.g., the second group of anchors 322, third group of anchors 324, fourth group of anchors 326, fifth group of anchors 328) and their corresponding 3D position in the 3D face mesh 210 and/or the extended 3D face mesh 214.

In some cases, the image processing system 100 can estimate a depth of the forehead region 306 to extend the forehead region 306 (and/or anchor points on the forehead region). In some cases, the image processing system 100 can estimate a depth of the forehead region 306 as part of a "ball" shape. In other cases, the image processing system 100 can estimate a depth of the forehead region 306 by combining the 3D face mesh 210 with a 4D head model. In the example combining the 3D face mesh 210 with a 4D head model, the image processing system 100 can solve a linear least squares problem to approximate the shape of the head.

As previously noted, in some examples, the forehead region 306 can be estimated as a ball shape. A ball rotation axis (e.g., a radius) can be estimated based on a set of top or boundary anchor points. The depth of the forehead region 306 can be estimated based on a number of circles on the ball shape. In some cases, the depth of the forehead region 306 can be estimated based on three circles on a ball shape. The different circles can represent different slices or portions of the ball structure. In some examples, the circles can be smaller the farther they are from a center of the ball structure representing the forehead region 306. In some examples, the largest circle can correspond to a center or center portion of the ball structure representing the forehead region 306.

Figure 4:
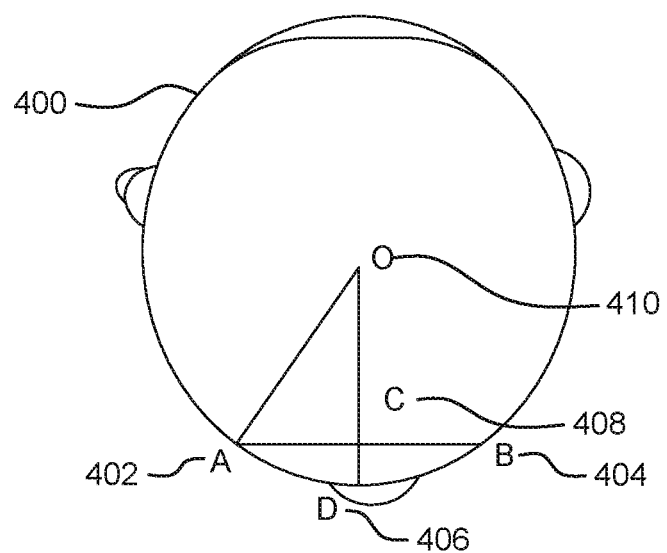
FIG. 4 is a diagram illustrating an example estimation of a radius of a circle of a ball structure used to estimate a depth of a forehead region, in accordance with some examples of the present disclosure.

In some cases, the radius of the largest circle of the ball structure can be used to estimate anchor points on the face region 302 of the 3D face mesh 210. Moreover, the radius of each of the other circles in the ball structure can be estimated based on a distance to the 3D face mesh 210 and a radius of the largest circle or a different circle. FIG. 4 illustrates an example estimation of a radius r of the largest circle 400 of a ball structure used to estimate a depth of the forehead region 306. In some examples, the radius r of the largest circle 400 can represent the radius of anchor points on the face region 302 of the 3D face mesh 210.

In FIG. 4, points 402 (A), 404 (B) and 406 (D) on circle 400 are anchor points on the 3D face mesh 210 (e.g., on a face boundary). Point 408 (C) can be the average point of points 402 (A) and 404 (B). Moreover, point 410 (O) can be the center of the circle 400. In some examples, the radius r of the circle 400 can be estimated based on Equations 1-3 as follows:

$$\sqrt{AC^2 + OC^2} = r^2 \qquad \text{Equation (1)}$$

$$OC + CD = r \qquad \text{Equation (2)}$$

$$r = \frac{AC^2 + CD^2}{2CD} \qquad \text{Equation (3)}$$

In some cases, the depth of the anchor points 402, 404, and 406 can be estimated based on their location and distance to the face region center (e.g., radius r of the circle 400). In some examples, a number of anchor points on each of the circles on the ball structure can be uniformly selected. A face height can be estimated based on the distance of top and bottom vertices on the face region 302 of the 3D face mesh 210. In some examples, the estimated circles can be n*face height apart from each other on the top of the face region 302 of the 3D face mesh 210, where n represents a multiplier value applied to a face height value, such as 0.1, 0.2, 0.5, etc., and can vary in different examples. For instance, in some cases, the estimated circles can be 0.1*face height apart from each other on the top of the face region 302 of the 3D face mesh 210.

In some examples, a first circle radius r1 can be estimated by multiplying the radius r by a value x, which can be a multiplier value and can vary in different examples. For example, the value x can vary based on, and/or can relate to, the multiplier value n used to calculate the distances of the estimated circles). To illustrate, in some cases, the value x can be 0.7, in which case the first circle radius r1 can be estimated by multiplying the radius r by 0.7. A second radius r2 can be estimated by multiplying the radius r1 by the value x (e.g., 0.7 in the previous example). A third radius r3 can be estimated by multiplying the radius r2 by the value x (e.g., 0.7 in the previous example). If the ball structure includes additional circles, the additional radius of each additional circles can be similarly estimated. In some cases, anchor points on a curve in the range of [−75, 75] degrees can be uniformly selected.

Figure 5:
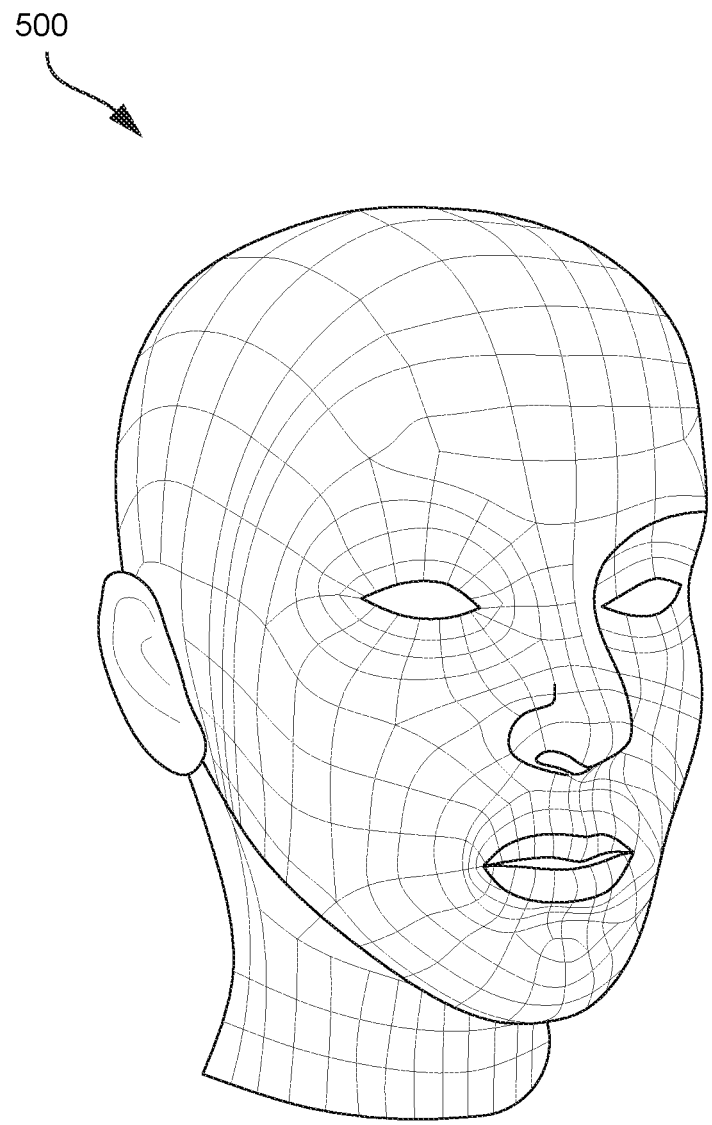
FIG. 5 illustrates an example 3D morphable head model that can be used with a 3D face mesh to estimate a depth of a forehead region, in accordance with some examples of the present disclosure.

As previously explained, in other cases, the image processing system 100 can estimate a depth of the forehead region 306 by combining the 3D face mesh 210 with a 4D head model. FIG. 5 illustrates an example 4D head model 500 that can be used with the 3D face mesh 210 to estimate a depth of the forehead region 306. In some examples, the 4D head model 500 can be a 3D morphable model (3DMM). For example, the 4D head model 500 can be a 3DMM model.

In some examples, a number of anchor points on the 4D head model 500 can be uniformly selected for each anchor group having corresponding anchor points (e.g., being included and/or captured in) on the 3D face mesh 210. The anchor points on the 4D head model 500 selected for each anchor group can be selected based on the distance of the anchor points and a center of the face region, as further described below. In some examples, the anchor groups having corresponding anchor points on the 3D face mesh 210 can include anchor groups corresponding to the first group of anchors 320 and the second group of anchors 322. For example, given the distance of the first group of anchors 320 and the second group of anchors 322 to the center of the face region being closer than that of the third, fourth, and fifth group of anchors (e.g., groups 324, 326, and 328, respectively), the first group of anchors 320 and the second group of anchors 322 may both be within the 4D head model 500 and the 3D face mesh 210.

In one illustrative example, a 3DMM model can be used to describe a 3D face space with principal component analysis (PCA). Below is an example Equation (4) that can be used to describe the 3D head shape:

$$S = \overline{S} + A_{id}\alpha_{id} + A_{exp}\alpha_{exp}, \qquad \text{Equation (4)}$$

where S is the 3D head shape, $\overline{S}$ is the mean face shape, $A_{id}$ is the eigenvectors (or principal components) trained on 3D face scans with neutral expression, $\alpha_{id}$ is a shape coefficient, $A_{exp}$ is the eigenvectors trained on the offsets between expression and neutral scans, and $\alpha_{exp}$ is the expression coefficient. The 3DMM head shape can be projected onto an image plane with weak perspective projection.

Example Equations (5) and (6) below can be used to calculate an aligned face shape:

$$I = mPR(\alpha, \beta, \gamma)S + t \quad \text{Equation (5)}$$

$$I = mPR(\alpha, \beta, \gamma)(\overline{S} + A_{id}\alpha_{id} + A_{exp}\alpha_{exp}) + t \quad \text{Equation (6)}$$

where I is the aligned face shape, S is the 3D face model, $R(\alpha, \beta, \gamma)$ is a 3×3 rotation matrix with $\alpha, \beta, \gamma$ rotation angles, m is a scale parameter, t is a translation vector, and P is the weak perspective transform.

In some examples, nonrigid iterative closest points (NICP) registrations can be applied between the face meshes and a cropped mean face of the 4D head model 500. Since the 3D face model (e.g., S or 3D face mesh 210) and the 4D head model 500 can have a different number of points, NICP can be used to align the 3D face model to the 4D head model 500. One example NICP registration that can be applied was described in B. Amberg, S. Romdhani, and T. Vetter, "Optimal Step Nonrigid Icp Algorithms For Surface Registration", In Computer Vision and Pattern Recognition, 2007, Conference on Computer Vision and Pattern Recognition (CVPR), which is incorporated herein by reference in its entirety and for all purposes.

The forehead region 306 can be approximated based on the 4D head model 500. For example, a number of anchor points can be uniformly chosen for each anchor group in the forehead region 306 (e.g., the first forehead group of anchors 330, second forehead group of anchors 332, and third forehead group of anchors 334) based on the distance of the anchor points and the face center. In one illustrative example, 40 anchor points can be uniformly chosen for each anchor group in the forehead region 306. In other examples, more or less than 40 anchor points can be chosen for each anchor group within the forehead region 306. In some cases, anchor points that are not on the head and/or hair region, such as anchor points on the left, right, and bottom of the face region (e.g., on and/or around the ear and neck regions), may not be on the 3D face model (e.g., the 3D face mesh 210). The forehead region 306 can then be approximated by triangulating the anchor points from each anchor group in the forehead region 306 based on their 3D coordinates, as further described below.

In some examples, to smoothen the extended 3D face mesh 214, the depth values of left, right, and bottom anchor points on the second group of anchors 322, the third group of anchors 324, and fourth group of anchors 326 can be determined by multiplying the minimum face contour points depth values times x, y, and z multiplier values, respectively, where x is larger than y and y is larger than z. For example, the minimum face contour points depth values can be multiplied by 0.9 (e.g., x), 0.8 (e.g., y), and 0.7 (e.g., z), respectively. In some examples, a number of anchor points surrounding a left, right and bottom of the face can be selected (and/or included in) from the second group of anchors 322, the third group of anchors 324, and fourth group of anchors 326 (e.g., left, right, and bottom anchor points from the second group of anchors 322, the third group of anchors 324, and fourth group of anchors 326). The depth values of the number of anchor points from the second group of anchors 322, the third group of anchors 324, and fourth group of anchors 326 (e.g., left, right, and bottom anchor points) can by determined by multiplying the minimum face contour points depth values as described above.

In some cases, the (X, Y) coordinates of the second group of anchors 322 can be computed based on the distance between the first group of anchors 320 (e.g., anchor points on the boundary of the face region 302) and the estimated 2D face center. The face center can be estimated by the average points of the 3D face mesh 210. The (X, Y) coordinates on the second group of anchors 322 can be estimated based on the distance of the face center and the first group of anchors 320. In some examples, the second group of anchors 322, the third group of anchors 324, and fourth group of anchors 326 can be respectively estimated by multiplying the distance between the first group of anchors 320 and the face center by respectively increasing values. For example, the second group of anchors 322, the third group of anchors 324, and fourth group of anchors 326 can be estimated by multiplying the distance between the first group of anchors 320 and the face center by 1.1, 1.3, and 1.5. In some cases, a number of anchor points for the fifth group of anchors 328 can be selected on each face image borderline (e.g., a border of the face model).

Figure 6:
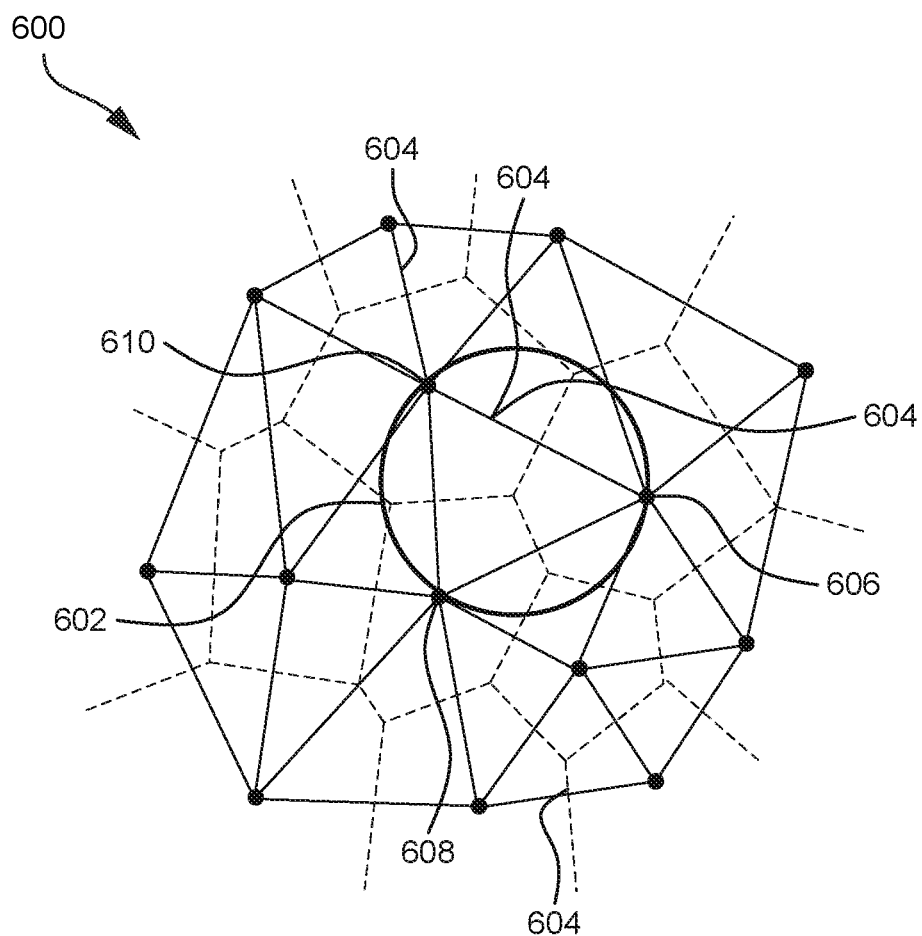
FIG. 6 is a diagram illustrating an example Delaunay triangulation used to triangulate anchor points and generate an extended 3D face mesh, in accordance with some examples of the present disclosure.

Once the 3D coordinates of the anchor points described above are determined, the 3D face mesh 210 can be extended based on the 3D coordinates of the anchor points. In some examples, a Delaunay triangulation can be performed to triangulate the anchor points and generate the extended 3D face mesh 214. FIG. 6 is a diagram illustrating an example Delaunay triangulation 600 used to triangulate anchor points and generate the extended 3D face mesh 214. For Delaunay triangulation, a Delaunay condition requires that circumcircles of triangles (e.g., all triangles of the anchor points) have empty interiors. When a set of points lie on a same line there is no Delaunay triangulation. On the other hand, for four or more points on the same circumcircle (e.g., the vertices of rectangle), the Delaunay triangulation is not unique as each of the two possible triangulations that split the quadrangle into two triangles satisfies the Delaunay condition.

In the example of FIG. 6, the Delaunay triangulation 600 includes Delaunay triangles 604 that satisfy the Delaunay condition that requires that circumcircles of all triangles have empty interiors. That is, no points lie in the interior of any triangle's circumcircle. For example, in the Delaunay triangulation 600, the circumcircle 602 includes points 606, 608, and 610 of the triangle 604 with vertices corresponding to points 606, 608, and 610. However, the circumcircle 602 does not include more than the 3 points 606, 608, and 610 of that triangle 604. Accordingly, since no additional points (beyond points 606, 608, 610) lie in the circumcircle 602, then the circumcircle 602 of the triangle 604 associated with points 606, 608, and 610 meets the Delaunay condition. Therefore, the triangle 604 associated with points 606, 608, and 610 is a valid Delaunay triangulation. If the circumcircles of the remaining triangles 604 similarly satisfy the Delaunay condition, then a valid Delaunay triangulation exists for the remaining triangles 604.

Figure 7:
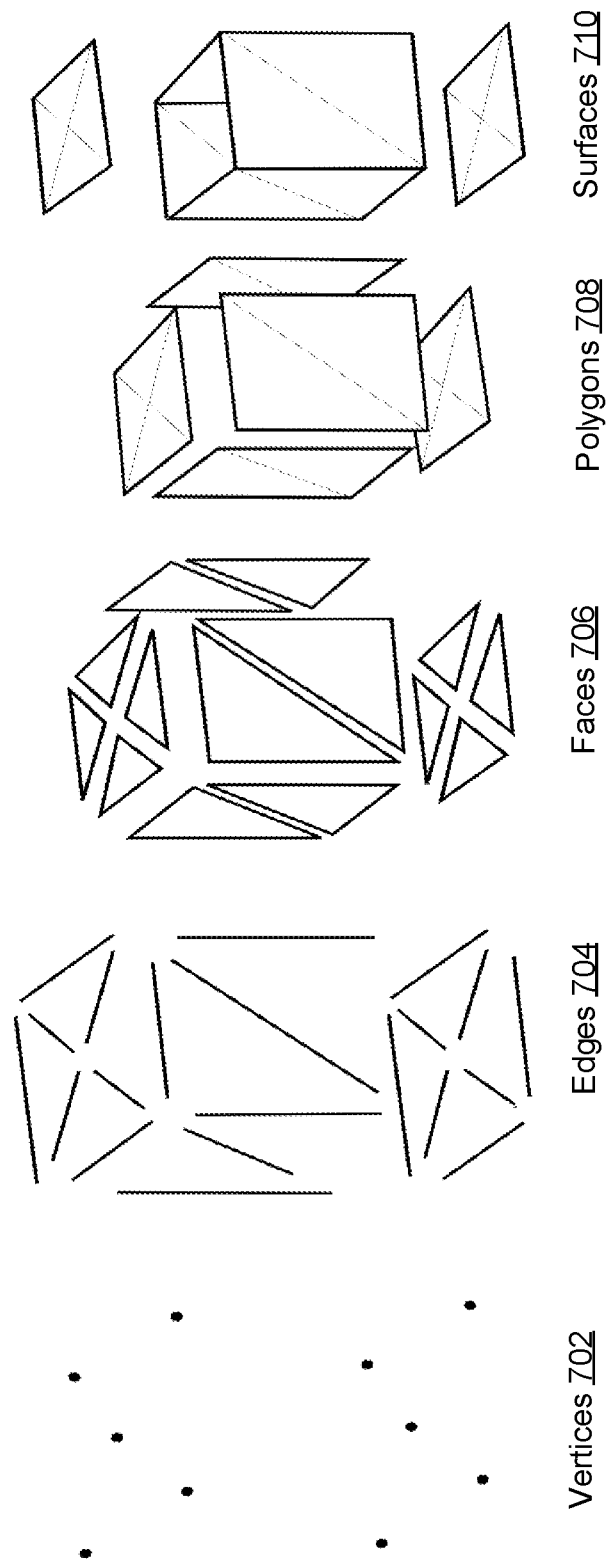
FIG. 7 is a diagram illustrating example elements of a 3D face mesh and/or an extended 3D face mesh, in accordance with some examples of the present disclosure.

FIG. 7 is a diagram illustrating example elements of a 3D face mesh 210 and/or an extended 3D face mesh 214. In the example shown in FIG. 7, the elements 702-710 correspond to a polygon mesh. In this example, the elements 702-710 of the polygon mesh include vertices 702, edges 704, faces 706, polygons 708, and surfaces 710. In other examples, the polygon mesh may only include or store vertices 702, edges 704 and either faces 706, polygons 708, or surfaces 710.

In some cases, a renderer may only support 3-sided faces. Accordingly, polygons can be constructed from multiple 3-sided faces. However, in other cases, a renderer may support quads and/or higher-sided polygons, or can convert polygons to triangles. Therefore, in some cases, a mesh may not need to be stored in a triangulated form.

Each of the vertices 702 can include a position in space (e.g., in 3D space) and other information such texture coordinates. In some cases, each of the vertices 702 can also store other information such as, for example, color information, depth information, vector coordinates, among others. In the 3D face mesh 210 and the extended 3D face mesh 214, each vertex can include spatial coordinates (X, Y, Z) in 3D space.

Each of the edges 704 can represent a connection between two vertices from the vertices 702. Moreover, a face of the faces 706 can include a closed set of edges. For example, a triangle face can include three edges, a quad face can include four edges, and so forth. Each of the polygons 708 can be a coplanar set of faces. In examples that support multi-sided faces, polygons and faces can be equivalent. In other cases where a renderer may only support 3-sided faces or 4-sided faces, the polygons may be represented as multiple faces. In some cases, a polygonal mesh can be an unstructured grid or an undirected graph with additional properties of geometry, shape and topology.

The surfaces 710 can form a modeled object, such as the 3D face structure associated with the 3D face mesh 210. Each surface can include one or more polygons. In some cases, surfaces can be smoothing groups used to group smooth regions of a modeled object.

Figure 8:
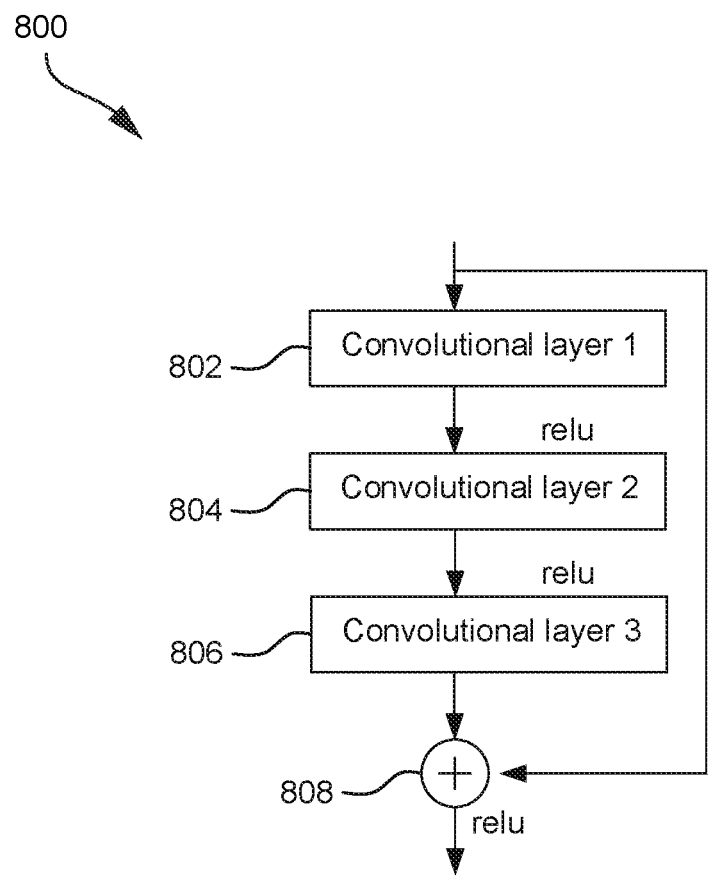
FIG. 8 is a diagram illustrating an example residual blocks structure which can be implemented as part of a structure of a UV position map prediction model, in accordance with some examples of the present disclosure.

FIG. 8 illustrates an example residual blocks structure 800 which can be implemented as part of a structure of the UV position map prediction model 206. In some examples, the UV position map prediction model 206 can include an encoder-decoder structure implemented to learn the transfer function from an input image 202 into a UV face position map 208. In some cases, the encoder part of the UV position map prediction model 206 can begin with a convolution layer followed by the residual blocks structure 800. The residual blocks structure 800 can include a number of residual blocks. In the illustrative example of FIG. 8, the residual blocks structure 800 includes three convolution layers 802, 804, and 806. The residual blocks structure 800 can also include a ReLU layer 808 that can be used for activation.

In some examples, convolution layer 802 and convolution layer 806 can include 1×1 convolution layers. Moreover, convolution layer 804 can include a 4×4 convolution layer. In some examples, the encoder part of the UV position map prediction model 206 can reduce an N×M×3 input image into smaller feature maps. For example, the encoder part of the UV position map prediction model 206 can reduce a 256×256×3 input image into 8×8×512 feature maps.

The decoder part of the UV position map prediction model 206 can include a number of transposed convolution layers to generate a predicted N×M×3 UV face position map, such as a 256×256×3 UV face position map. In some examples, a certain kernel size, such as a kernel size of 4, can be used for convolution or transposed convolution layers. The UV position map prediction model 206 can generate the UV face position map 208, which can contain 3D information and a dense alignment result, as previously explained.

Table 1 below depicts an example sequence of layers in an example encoder part of the UV position map prediction model 206 and Table 2 depicts an example sequence of layers in a decoder part of the UV position map prediction model 206.

TABLE 1

| Input | Operator | Channel | Repeated | Kernel Size | Stride |
|---|---|---|---|---|---|
| $256^2 \times 3$ | conv2d | 16 | 1 | 4 | 1 |
| $128^2 \times 16$ | ResBlock | 32 | 1 | 4 | 2 |
| $128^2 \times 32$ | ResBlock | 32 | 1 | 4 | 1 |
| $64^2 \times 32$ | ResBlock | 64 | 1 | 4 | 2 |
| $64^2 \times 64$ | ResBlock | 64 | 1 | 4 | 1 |
| $32^2 \times 64$ | ResBlock | 128 | 1 | 4 | 2 |
| $32^2 \times 128$ | ResBlock | 128 | 1 | 4 | 1 |
| $16^2 \times 128$ | ResBlock | 256 | 1 | 4 | 2 |
| $16^2 \times 256$ | ResBlock | 256 | 1 | 4 | 1 |
| $8^2 \times 256$ | ResBlock | 512 | 1 | 4 | 2 |
| $8^2 \times 512$ | ResBlock | 512 | 1 | 4 | 1 |

TABLE 2

| Input | Operator | Channel | Repeated | Kernel Size | Stride |
|---|---|---|---|---|---|
| $8^2 \times 512$ | conv2d_transpose | 512 | 1 | 4 | 1 |
| $16^2 \times 256$ | conv2d_transpose | 256 | 1 | 4 | 2 |
| $16^2 \times 256$ | conv2d_transpose | 256 | 1 | 4 | 1 |
| $16^2 \times 256$ | conv2d_transpose | 256 | 1 | 4 | 1 |
| $32^2 \times 128$ | conv2d_transpose | 128 | 1 | 4 | 2 |
| $32^2 \times 128$ | conv2d_transpose | 128 | 1 | 4 | 1 |
| $32^2 \times 128$ | conv2d_transpose | 128 | 1 | 4 | 1 |
| $64^2 \times 64$ | conv2d_transpose | 64 | 1 | 4 | 2 |
| $64^2 \times 64$ | conv2d_transpose | 64 | 1 | 4 | 1 |
| $64^2 \times 64$ | conv2d_transpose | 64 | 1 | 4 | 1 |
| $128^2 \times 32$ | conv2d_transpose | 32 | 1 | 4 | 2 |
| $128^2 \times 32$ | conv2d_transpose | 32 | 1 | 4 | 1 |
| $256^2 \times 16$ | conv2d_transpose | 16 | 1 | 4 | 2 |
| $256^2 \times 16$ | conv2d_transpose | 16 | 1 | 4 | 1 |
| $256^2 \times 3$ | conv2d_transpose | 3 | 2 | 4 | 1 |
| $256^2 \times 3$ | conv2d_transpose | 3 | 1 | 4 | 1 |

Figure 9:
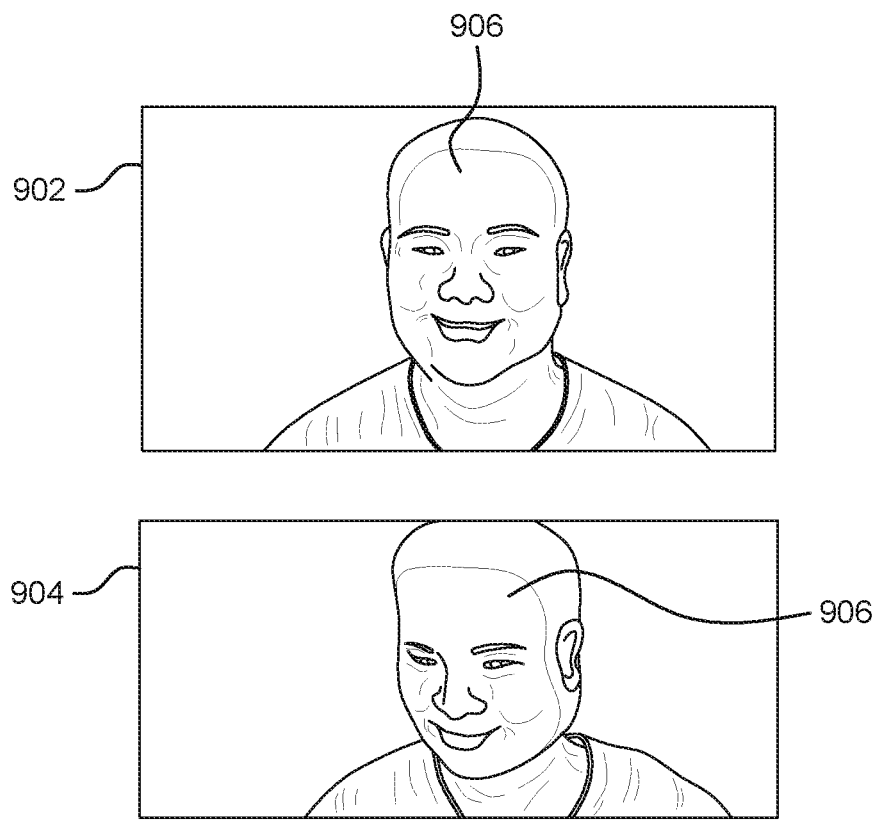
FIG. 9 illustrates an example image of a face and an example image generated with a rotated face, in accordance with some examples of the present disclosure.

FIG. 9 illustrates an example image 902 of a face 906 and an example generated image 904 with the face 906 rotated as previously described. In some examples, the image 902 can be an example of the input image 202 of the system flow 200 shown in FIG. 2, and the generated image 904 can be an example output image 216 of the system flow 200. The generated image 904 can be produced by extending a 3D face mesh (e.g., 3D face mesh 214) generated from the image 902 and mapping the extended 3D face mesh to the image 902.

As shown, by extending the 3D face mesh, the rotated facial images (e.g., image 904) generated can appear more realistic and/or natural. The estimated forehead region can be accurately captured and/or represented in the rotated forehead region. Moreover, the hair region and other region(s) surrounding the face can help make the augmented face appear more realistic.

FIG. 10 is a flowchart illustrating an example process 1000 for face image augmentation. In some examples, the process 1000 can be used to generate a facial image with a rotated face based on an original facial image. At block 1002, the process 1000 can include obtaining a first image (e.g., input image 202) capturing a face of a user. In some examples, the face of the user can include a certain head pose, expression, and/or face attributes. Moreover, the first image can include a background surrounding at least a portion of the face.

At block 1004, the process 1000 can include determining, based on the first image and using a prediction model (e.g., UV position map prediction model 206), a UV face position map (e.g., UV face position map 208) including a two-dimensional (2D) representation of a three-dimensional (3D) structure of the face. In some examples, the prediction model can include a convolutional neural network (CNN). In some cases, the UV face position map can be determined based on a cropped version of the first image. For example, in some cases, the process 1000 can include detecting (e.g., via face detection) a face region in the first image, and cropping the first image to include the face region by removing one or more other portions of the first image other than the face region. The process 1000 can then determine the UV face position map based on the cropped first image. The face region can include the face of the user. In some examples, the face region can include a region within a bounding box (e.g., bounding box 220) around the face of the user. In some cases, the region within the bounding box can include the face of the user and one or more surrounding regions such as, for example, a hair region, a neck region, an ear region, a shoulder region, a background region, etc.

In some cases, the UV face position map can record the 3D structure of the face in UV space. Moreover, in some cases, the UV face position map can be projected onto a color image space. In some examples, color channels in the UV face position map can include 3D locations of points in the UV face position map. The 3D locations can include 3D coordinates in the 3D structure of the face.

At block 1006, the process 1000 can include generating, based on the UV face position map, a 3D model (e.g., 3D face mesh 210) of the face. In some cases, generating the 3D model of the face can include projecting the UV face position map to 3D space. In some examples, the 3D model can include a 3D face mesh including vertices connected by edges and faces. In some cases, the 3D face mesh can be generated by assigning 3D coordinates to the vertices. The 3D coordinates can correspond to the 3D structure of the face and corresponding points (e.g., points corresponding or mapped to the 3D coordinates) in the UV face position map.

At block 1008, the process 1000 can include generating an extended 3D model (e.g., extended 3D face mesh 214) of the face. In some cases, the extended 3D model can be generated by extending the 3D model of the face to include one or more regions (e.g., background region 304, forehead region 306, hair region 308, etc.) beyond a boundary of the 3D model of the face (e.g., beyond or outside of the face region 302 (or a contour of the face region 302) included in the 3D face mesh 210, beyond or outside of a background region (or a contour of the background region) included in the 3D face mesh 210). In some examples, the one or more regions can include a forehead region (e.g., forehead region 306) and/or a region surrounding at least a portion of the face. In some cases, the region surrounding at least a portion of the face can include a hair and/or head region (e.g., hair region 308), a background region (e.g., background region 304), a neck region, and/or an ear region.

At block 1010, the process 1000 can include generating, based on the extended 3D model of the face, a second image (e.g., output image 216) depicting the face in a rotated position relative to a position of the face in the first image. In some examples, the face can be rotated in a different direction and/or angle relative to the position of the face in the first image. In some examples, the rotated position can include a different head pose. In some cases, generating the second image can include mapping the first image to the extended 3D model, and rotating the face in the mapping of the first image to the extended 3D model. The face can be rotated in the rotated position.

In some cases, the extended 3D model can be generated based on depth information (e.g., depth information 212) associated with the forehead region and/or the region surrounding at least a portion of the face. In some examples, the depth information can include a first depth of the forehead region and/or a second depth of the region surrounding at least a portion of the face. In some aspects, the process 1000 can include determining the depth information.

In some cases, determining the depth information can include estimating depths of a first group of anchor points (e.g., first group of anchors 320) on a face region and a second group of anchor points (e.g., second group of anchors 322) on and/or included in the forehead region. In some cases, determining the depth information can also include estimating depths of a third group of anchor points (e.g., third group of anchors 324), a fourth group of anchor points (e.g., fourth group of anchors 326), and/or a fifth group of anchor points (e.g., fifth group of anchors 328) on one or more regions surrounding at least a portion of the face. In some cases, a depth of an anchor point is estimated based on a first location of the anchor point within the 3D model and a distance of the anchor point to a second location on the face, such as a point on the face, a center of the face, and/or any other location on the face.

In some examples, the second group of anchor points (e.g., second group of anchors 322) and/or the third group of anchor points (e.g., third group of anchors 324) can be estimated based on 3D coordinates of the first group of anchor points (e.g., first group of anchors 320). In some examples, generating the extended 3D model can include triangulating the first group of anchor points and the second group of anchor points and/or the third group of anchor points.

In some aspects, estimating the first depth of the forehead region can include estimating a forehead shape corresponding to the forehead region, determining a set of different circles within the forehead shape, and estimating the first depth of the forehead region based on a respective radius of each circle (e.g., circle 400) of the set of different circles. In some cases, the forehead shape can be calculated as a ball shape. In some examples, the first depth of the forehead region and/or the radius of each circle can be calculated as previously described with respect to FIG. 4. In some cases, the radius of one or more circles can be calculated using Equations 1-3 as previously described.

In some aspects, estimating the first depth of the forehead region can be based on the 3D model of the face and a 3D morphable head model (e.g., 4D head model 500) describing a 3D shape of a head.

While the process 1000 is described with respect to facial images and face rotation, other examples can involve rotation of an object or animal (or a portion thereof) based on images of the object or animal and according to process 1000. For example, in some cases, the input image can include an image of an object (e.g., a device, a vehicle, a structure, a building, an item, a piece of equipment, etc.) or animal, and the image of the object or animal can be used to derive a UV position map, a 3D mesh model, and an extended 3D mesh model for the object or animal, which can then be used to generate an output image of the object or animal rotated. It should be understood that facial images and face rotation is provided herein as an illustrative example for explanation purposes. Moreover, it should be understood that the technologies and techniques described above with respect to FIGS. 1 through 9 can also apply to rotation of an object or animal (or a portion thereof) based on images of the object or animal.

In some examples, the processes described herein (e.g., processes 200, 1000, and/or any other process described herein) may be performed by a computing device or apparatus. In one example, the process 1000 can be performed by the image processing system 100 of FIG. 1. In another example, the process 1000 can be performed by the computing system having the computing device architecture 1100 shown in FIG. 11. For instance, a computing device with the computing device architecture 1100 shown in FIG. 11 can implement the operations of FIG. 10 and/or the components and/or operations described herein with respect to any of FIGS. 1 through 9.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the processes 200, 1000, and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 200 and 1000 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 200, 1000, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
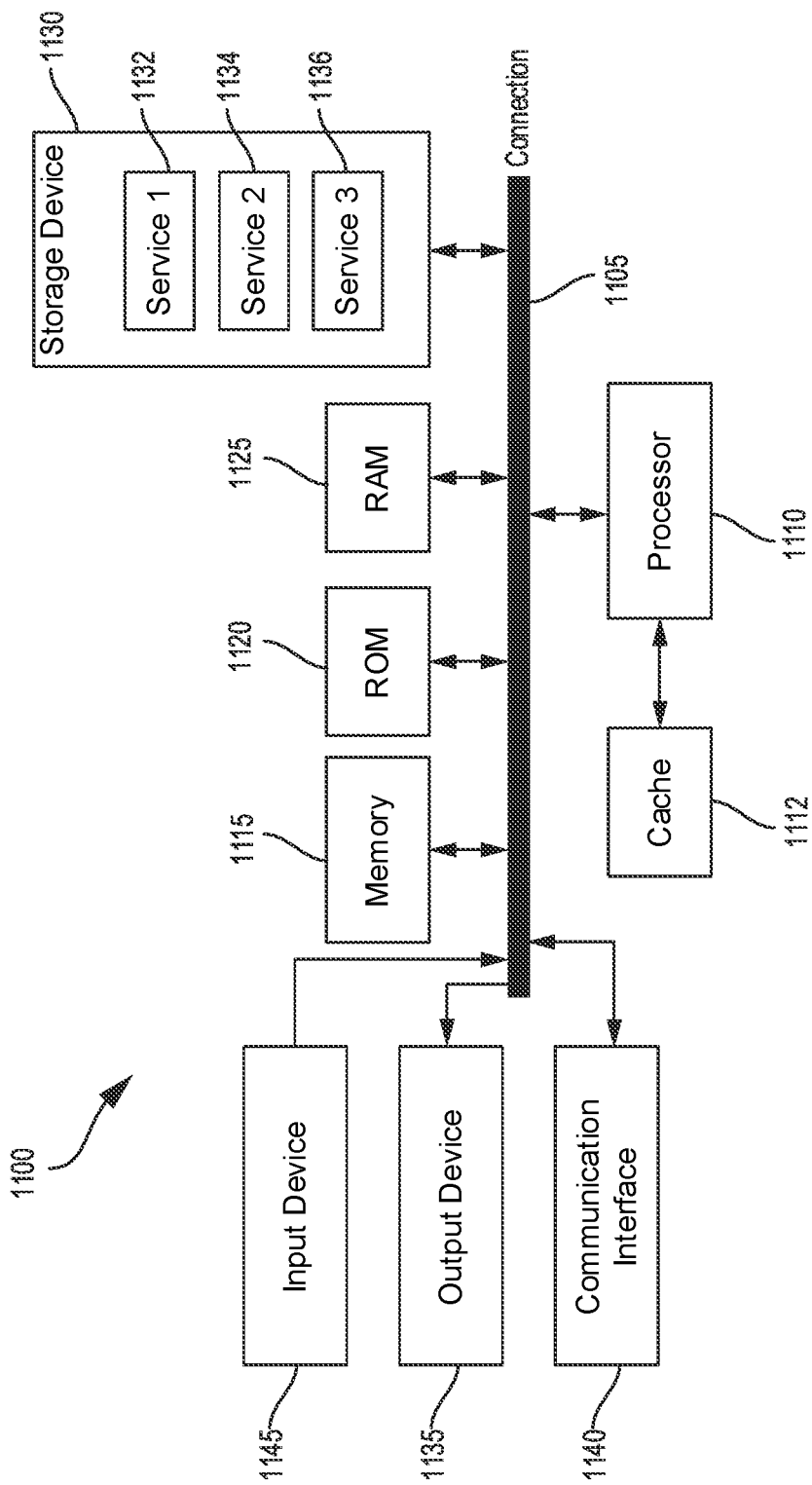
FIG. 11 is a diagram illustrating an example system architecture for implementing certain aspects described herein.

FIG. 11 illustrates an example computing device architecture 1100 of an example computing device which can implement various techniques described herein. For example, the computing device architecture 1100 can implement at least some portions of the image processing system 100 shown in FIG. 1. The components of the computing device architecture 1100 are shown in electrical communication with each other using a connection 1105, such as a bus. The example computing device architecture 1100 includes a processing unit (CPU or processor) 1110 and a computing device connection 1105 that couples various computing device components including the computing device memory 1115, such as read only memory (ROM) 1120 and random access memory (RAM) 1125, to the processor 1110.

The computing device architecture 1100 can include a cache of high-speed memory connected directly with, in close proximity to, or integrated as part of the processor 1110. The computing device architecture 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other computing device memory 1115 may be available for use as well. The memory 1115 can include multiple different types of memory with different performance characteristics. The processor 1110 can include any general purpose processor and a hardware or software service (e.g., service 1 1132, service 2 1134, and service 3 1136) stored in storage device 1130 and configured to control the processor 1110 as well as a special-purpose processor where software instructions are incorporated into the processor design. The processor 1110 may be a self-contained system, containing multiple cores or processors, a bus, memory controller, cache, etc. A multi-core processor may be symmetric or asymmetric.

To enable user interaction with the computing device architecture 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art, such as a display, projector, television, speaker device. In some instances, multimodal computing devices can enable a user to provide multiple types of input to communicate with the computing device architecture 1100. The communication interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. The storage device 1130 can include service 1132, service 1134, and service 1136 for controlling the processor 1110. Other hardware or software modules are contemplated. The storage device 1130 can be connected to the computing device connection 1105. In one aspect, a hardware module that performs a particular function can include the software component stored in a computer-readable medium in connection with the necessary hardware components, such as the processor 1110, connection 1105, output device 1135, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. An apparatus comprising:
    memory; and
    one or more processors coupled to the memory, the one or more processors being configured to:
        obtain a first image depicting a face of a user;
        determine, based on the first image and using a prediction model, a UV face position map including a two-dimensional (2D) representation of a three-dimensional (3D) structure of the face;
        generate, based on the UV face position map, a 3D model of the face;
        generate an extended 3D model of the face by extending the 3D model of the face to include one or more regions beyond a boundary of the 3D model of the face, the one or more regions comprising a forehead region; and
        generate, based on the extended 3D model of the face, a second image depicting the face in a rotated position relative to a position of the face in the first image.

2. The apparatus of claim 1, the one or more processors being configured to:
    detect a face region in the first image, the face region including the face of the user; and
    crop the first image to include the face region by removing one or more other portions of the first image other than the face region;
    wherein determining the UV face position map is based on the cropped first image.

3. The apparatus of claim 1, wherein the prediction model comprises a convolutional neural network (CNN), and wherein the UV face position map records the 3D structure of the face in UV space.

4. The apparatus of claim 1, wherein the UV face position map is projected onto a color image space, wherein color channels in the UV face position map include 3D locations of points in the UV face position map, and wherein the 3D locations comprise 3D coordinates in the 3D structure of the face.

5. The apparatus of claim 1, wherein generating the 3D model of the face comprises projecting the UV face position map to 3D space.

6. The apparatus of claim 5, wherein the 3D model comprises a 3D face mesh including vertices connected by edges and faces, and wherein the 3D face mesh is generated by assigning 3D coordinates to the vertices, the 3D coordinates corresponding to the 3D structure of the face and corresponding points in the UV face position map.

7. The apparatus of claim 1, the one or more processors being configured to:
determine depth information associated with at least one of the forehead region and a region surrounding at least a portion of the face, wherein the depth information comprises at least one of a first depth of the forehead region and a second depth of the region surrounding at least a portion of the face, and wherein the extended 3D model is generated based on the depth information.

8. The apparatus of claim 7, wherein determining the depth information comprises:
estimating depths of a first group of anchor points on a face region and at least one of a second group of anchor points on the forehead region and a third group of anchor points on the region surrounding at least a portion of the face, wherein a depth of an anchor point is estimated based on a first location of the anchor point within the 3D model and a distance of the anchor point to a second location on the face.

9. The apparatus of claim 8, wherein at least one of the second group of anchor points and the third group of anchor points is estimated based on 3D coordinates of the first group of anchor points, and wherein generating the extended 3D model comprises triangulating the first group of anchor points and at least one of the second group of anchor points and the third group of anchor points.

10. The apparatus of claim 8, wherein, to estimate the first depth of the forehead regions, the one or more processors are configured to:
estimate a forehead shape corresponding to the forehead region;
determine a set of different circles within the forehead shape; and
estimate the first depth of the forehead region based on a respective radius of each circle of the set of different circles.

11. The apparatus of claim 8, the one or more processors being configured to estimate the first depth of the forehead region based on the 3D model of the face and a 3D morphable head model describing a 3D shape of a head.

12. The apparatus of claim 1, wherein the one or more regions further comprise a region surrounding at least a portion of the face, and wherein the region surrounding at least a portion of the face comprises at least one of a background region of the first image, a hair region, a neck region, and an ear region.

13. The apparatus of claim 1, wherein generating the second image comprises:
mapping the first image to the extended 3D model; and
rotating the face in the mapping of the first image to the extended 3D model, the face being rotated in the rotated position.

14. The apparatus of claim 1, wherein the apparatus comprises a mobile device.

15. The apparatus of claim 1, wherein the apparatus comprises a camera device.

16. A method comprising:
obtaining a first image depicting a face of a user;
determining, based on the first image and using a prediction model, a UV face position map including a two-dimensional (2D) representation of a three-dimensional (3D) structure of the face;
generating, based on the UV face position map, a 3D model of the face;
generating an extended 3D model of the face by extending the 3D model of the face to include one or more regions beyond a boundary of the 3D model of the face, the one or more regions comprising a forehead region; and
generating, based on the extended 3D model of the face, a second image depicting the face in a rotated position relative to a position of the face in the first image.

17. The method of claim 16, further comprising:
detecting a face region in the first image, the face region including the face of the user; and
cropping the first image to include the face region by removing one or more other portions of the first image other than the face region;
wherein determining the UV face position map is based on the cropped first image.

18. The method of claim 16, wherein the prediction model comprises a convolutional neural network (CNN), and wherein the UV face position map records the 3D structure of the face in UV space.

19. The method of claim 16, wherein the UV face position map is projected onto a color image space, wherein color channels in the UV face position map include 3D locations of points in the UV face position map, and wherein the 3D locations comprise 3D coordinates in the 3D structure of the face.

20. The method of claim 16, wherein generating the 3D model of the face comprises projecting the UV face position map to 3D space.

21. The method of claim 20, wherein the 3D model comprises a 3D face mesh including vertices connected by edges and faces, and wherein the 3D face mesh is generated by assigning 3D coordinates to the vertices, the 3D coordinates corresponding to the 3D structure of the face and corresponding points in the UV face position map.

22. The method of claim 16, further comprising:
determining depth information associated with at least one of the forehead region and a region surrounding at least a portion of the face, wherein the depth information comprises at least one of a first depth of the forehead region and a second depth of the region surrounding at least a portion of the face, and wherein the extended 3D model is generated based on the depth information.

23. The method of claim 22, wherein determining the depth information comprises:
estimating depths of a first group of anchor points on a face region and at least one of a second group of anchor points on the forehead region and a third group of anchor points on the region surrounding at least a portion of the face, wherein a depth of an anchor point is estimated based on a first location of the anchor point within the 3D model and a distance of the anchor point to a second location on the face.

24. The method of claim 23, wherein at least one of the second group of anchor points and the third group of anchor points is estimated based on 3D coordinates of the first group of anchor points, and wherein generating the extended 3D model comprises triangulating the first group of anchor points and at least one of the second group of anchor points and the third group of anchor points.

25. The method of claim 23, further comprising estimating the first depth of the forehead region by:
- estimating a forehead shape corresponding to the forehead region;
- determining a set of different circles within the forehead shape; and
- estimating the first depth of the forehead region based on a respective radius of each circle of the set of different circles.

26. The method of claim 23, further comprising estimating the first depth of the forehead region based on the 3D model of the face and a 3D morphable head model describing a 3D shape of a head.

27. The method of claim 16, wherein the one or more regions further comprise a region surrounding at least a portion of the face, and wherein the region surrounding at least a portion of the face comprises at least one of a background region of the first image, a hair region, a neck region, and an ear region.

28. The method of claim 16, wherein generating the second image comprises:
- mapping the first image to the extended 3D model; and
- rotating the face in the mapping of the first image to the extended 3D model, the face being rotated in the rotated position.

29. A non-transitory computer-readable medium having stored thereon instructions which, when executed by one or more processors, cause the one or more processors to:
- obtain a first image depicting a face of a user;
- determine, based on the first image and using a prediction model, a UV face position map including a two-dimensional (2D) representation of a three-dimensional (3D) structure of the face;
- generate, based on the UV face position map, a 3D model of the face;
- generate an extended 3D model of the face by extending the 3D model of the face to include one or more regions beyond a boundary of the 3D model of the face, the one or more regions comprising a forehead region; and
- generate, based on the extended 3D model of the face, a second image depicting the face in a rotated position relative to a position of the face in the first image.

* * * * *